(12) United States Patent
Santoso et al.

(10) Patent No.: US 9,148,391 B2
(45) Date of Patent: Sep. 29, 2015

(54) SYSTEM AND METHOD FOR A PASS THRU MODE IN A VIRTUAL CHASSIS SYSTEM

(71) Applicants: Ignatius D. Santoso, Thousand Oaks, CA (US); Roberto H. Jacob Da Silva, Oak Park, CA (US); Nalinakshan Kunnath, Camarillo, CA (US)

(72) Inventors: Ignatius D. Santoso, Thousand Oaks, CA (US); Roberto H. Jacob Da Silva, Oak Park, CA (US); Nalinakshan Kunnath, Camarillo, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 383 days.

(21) Appl. No.: 13/674,352

(22) Filed: Nov. 12, 2012

(65) Prior Publication Data
US 2013/0064137 A1    Mar. 14, 2013

Related U.S. Application Data

(63) Continuation-in-part of application No. 13/010,168, filed on Jan. 20, 2011, now Pat. No. 8,767,735.

(60) Provisional application No. 61/370,622, filed on Aug. 4, 2010, provisional application No. 61/658,159, filed on Jun. 11, 2012.

(51) Int. Cl.
H04L 12/939      (2013.01)
H04L 12/931      (2013.01)
H04L 12/775      (2013.01)
H04L 12/709      (2013.01)
H04L 12/707      (2013.01)
H04L 12/703      (2013.01)

(52) U.S. Cl.
CPC ............ *H04L 49/552* (2013.01); *H04L 45/245* (2013.01); *H04L 45/58* (2013.01); *H04L 49/65* (2013.01); *H04L 49/70* (2013.01); *H04L 45/22* (2013.01); *H04L 45/28* (2013.01)

(58) Field of Classification Search
CPC ..... H04L 49/70; H04L 45/586; H04L 45/583; H04L 45/58; H04L 49/357; H04L 45/245
See application file for complete search history.

(56) References Cited

U.S. PATENT DOCUMENTS

| | | | |
|---|---|---|---|
| 7,483,383 B2 | 1/2009 | Santoso et al. | |
| 7,505,403 B2 | 3/2009 | Santoso et al. | |
| 8,023,404 B1 | 9/2011 | Narayanan et al. | |
| 2005/0063395 A1 | 3/2005 | Smith et al. | |
| 2008/0310421 A1* | 12/2008 | Teisberg et al. | 370/395.53 |

(Continued)

OTHER PUBLICATIONS

International Searching Authority; International Search Report and Written Opinion; International Application No. PCT/US13/068625; May 6, 2014; 11 pgs.

*Primary Examiner* — Jung Park
(74) *Attorney, Agent, or Firm* — Loza & Loza, LLP

(57) ABSTRACT

A virtual chassis system includes a plurality of network nodes connected by virtual fabric link (VFLs) that provide a connection for exchange of packets between the network nodes. A network node in the virtual chassis system is operable in a pass thru mode. In pass thru mode, the network node receives packets over a VFL and transparently forwards the packet over another VFL to another network node in the virtual chassis system. However, the network node 110 disables other port interfaces, such as port interfaces connected to external nodes from the virtual chassis system. The network node 110 in pass thru mode is operable to receive management commands over one or more VFLs and can still be managed through management commands.

7 Claims, 12 Drawing Sheets

(56) References Cited

U.S. PATENT DOCUMENTS

| | | |
|---|---|---|
| 2011/0051624 A1 | 3/2011 | Gnanasekaran et al. |
| 2011/0085559 A1 * | 4/2011 | Chung et al. ................ 370/401 |
| 2011/0149743 A1 * | 6/2011 | Agarwal et al. ............... 370/242 |
| 2011/0299385 A1 * | 12/2011 | Narayanan et al. ........... 370/218 |
| 2013/0243008 A1 * | 9/2013 | Singla et al. .................. 370/422 |

* cited by examiner

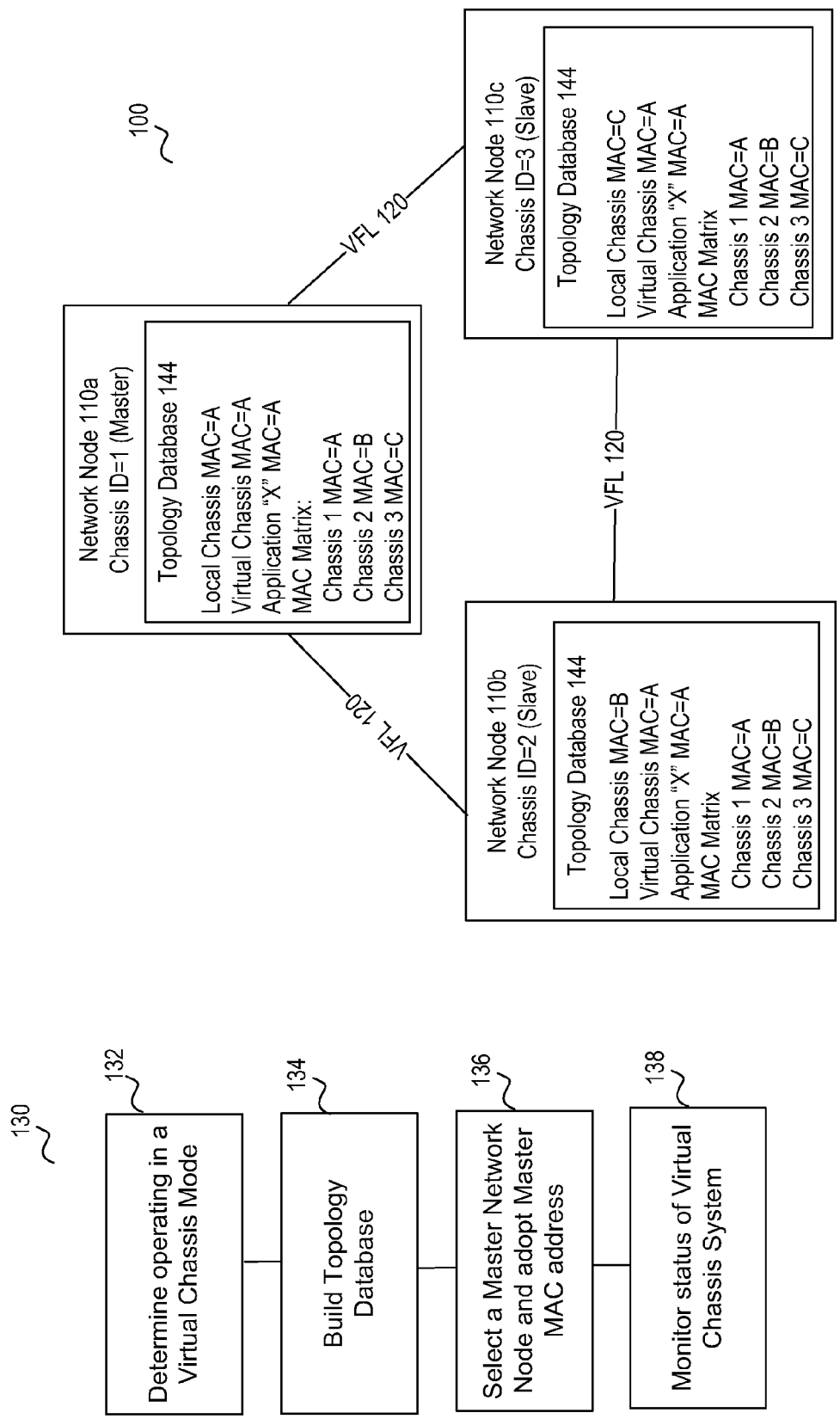

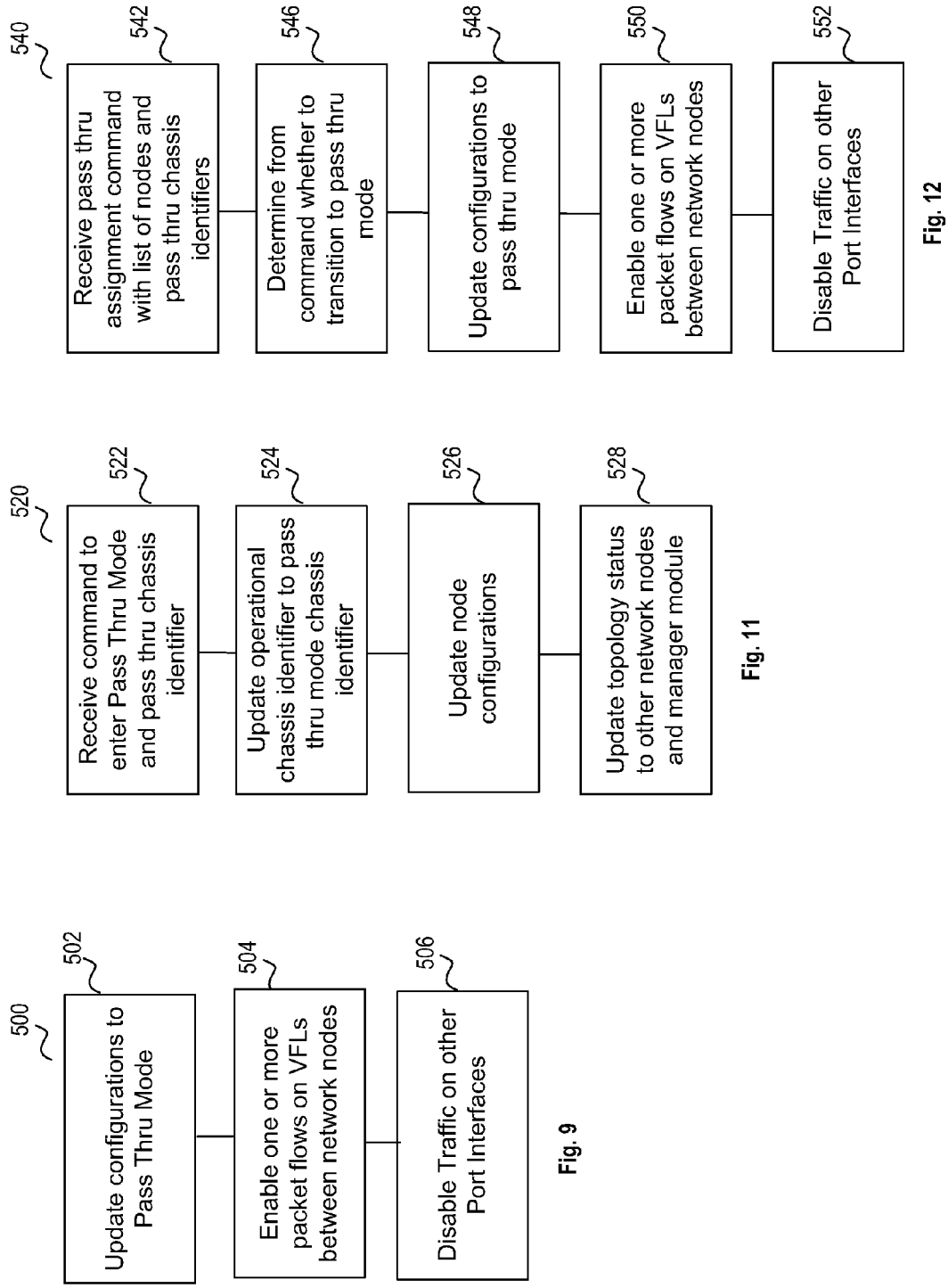

| Pass Thru Assignment Command 600 | | | | |
|---|---|---|---|---|
| Packet Type 602 | Command Type 604 | Node Identifier 606 | Pass Thru Chassis Identifier 608 | Reason Code 610 |

SYSTEM AND METHOD FOR A PASS THRU MODE IN A VIRTUAL CHASSIS SYSTEM

CROSS-REFERENCE TO RELATED PATENTS

The present U.S. Utility Patent Application claims priority as a continuation in part pursuant to 35 U.S.C. §120 to U.S. patent application Ser. No. 13/010,168, entitled, "SYSTEM AND METHOD FOR MULTI-CHASSIS LINK AGGREGATION," filed Jan. 20, 2011, now issued as U.S. Pat. No. 8,767,735, on Jul. 1, 2014, which is incorporated by reference herein and made part of the present U.S. Utility Patent Application for all purposes and which claims priority pursuant to 35 U.S.C. §119(e) to U.S. Provisional Application Ser. No. 61/370,622, entitled, "MULTICHASSIS VIRTUAL-FABRIC LINK AGGREGATION SYSTEM," filed Aug. 4, 2010, which is incorporated by reference herein and made part of the present U.S. Utility Patent Application for all purposes.

The present U.S. Utility Patent Application claims priority pursuant to 35 U.S.C. §119(e) to U.S. Provisional Application Ser. No. 61/658,159, entitled, "VIRTUAL CHASSIS WITH GENERIC NODE ARCHITECTURE AND TOPOLOGY," filed Jun. 11, 2012, which is incorporated by reference herein and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing topological redundancy and resiliency between nodes of one or more data networks.

2. Description of Related Art

Data networks include various computing devices, for example, personal computers, IP telephony devices or servers that communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include interconnected nodes, commonly known as switches or routers, for routing traffic through the network.

One of the key challenges faced by data networks is the need for network resiliency, i.e., the ability to maintain high availability despite eventual component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for switching/routing traffic flows through the network. As will be appreciated, detection and convergence times must occur quickly (advantageously, in less than one second) in networks to achieve seamless transition to the alternate paths. Various types of network topologies are implemented within a network to provide redundancy between network elements, such as a ring networks, partial mesh networks, full mesh networks, hub networks, etc. Convergence times and redundancy between network elements often varies depending on the type of network typology implemented in a network.

Architectures of network elements also vary and affect network resiliency. For example, various node architectures include single switching elements, stackable switching elements, multi-slot chassis based network elements, etc. In general, depending on cost and network needs, one of these types of node architectures is selected and implemented into one of the types of network topologies. However, once implemented, it is sometimes difficult to upgrade or transition from one type of network topology to another type of network topology. It is also difficult to transition from one type of node architecture to another type of node architecture within a network topology or to incorporate various types of node architectures within one network.

Accordingly, there is a need for systems and methods for providing resiliency between nodes having one or more different types of node architectures in one or more different types of network topologies.

BRIEF DESCRIPTION OF THE SEVERAL VIEWS OF THE DRAWINGS

FIG. 2 illustrates a logical flow diagram of an embodiment of a network topology discovery process in a virtual chassis system in accordance with the present invention;

FIG. 3 illustrates a schematic block diagram of an embodiment of topology database in a network node in a virtual chassis system in accordance with the present invention;

FIG. 9 illustrates a logical flow diagram of an embodiment of a method for pass thru mode of a network node in a virtual chassis system in accordance with the present invention;

FIG. 11 illustrates a logic flow diagram of an embodiment of a method for updating configurations of a network node to pass thru mode in accordance with the present invention;

FIG. 12 illustrates a logic flow diagram of an embodiment of a method for pass thru mode in the event of an excess of network nodes in a virtual chassis system in accordance with the present invention;

DETAILED DESCRIPTION OF THE INVENTION

The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; and 2) IEEE Std. 802.1Q, Virtual Bridged Local Area Networks, 2003 edition.

Figure 1A:
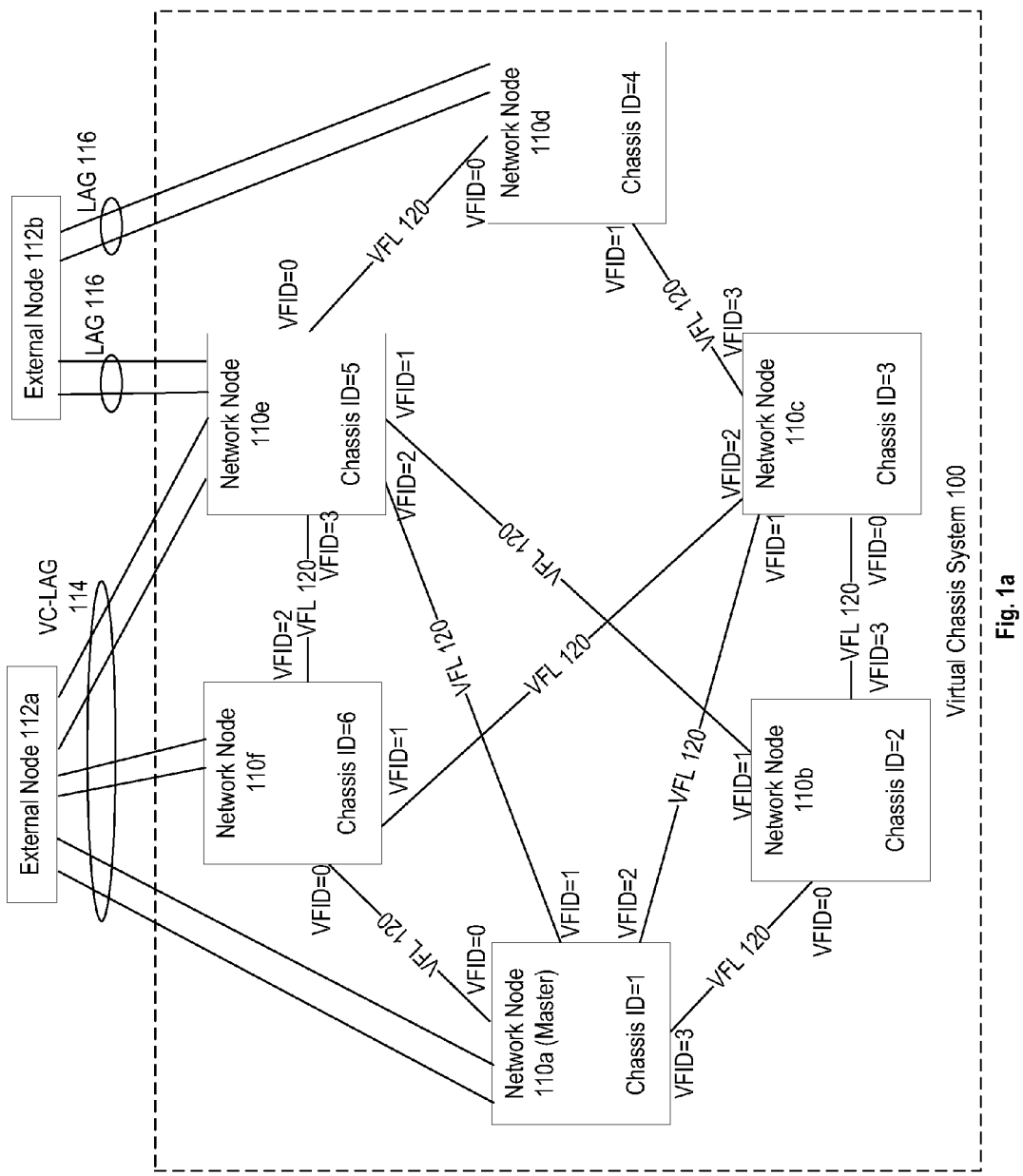
FIGS. 1a-c illustrate schematic block diagrams of embodiments of a virtual chassis system in accordance with the present invention.

FIG. 1a illustrates an embodiment of a virtual chassis system 100 including a plurality of network nodes 110 operably coupled by dedicated link aggregate groups for communicating control and addressing information called virtual fabric links (VFLs) 120. VFLs 120 and their operation are described in more detail in U.S. patent application Ser. No. 13/010,168, entitled, "SYSTEM AND METHOD FOR MULTI-CHASSIS LINK AGGREGATION," filed Jan. 20, 2011, pending, which is incorporated by reference herein and made part of the present U.S. Utility Patent Application for all purposes. The VFLs 120 provide connections between the network nodes 110 for exchange of information related to traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of the network nodes and external links.

In an embodiment, the plurality of network nodes 110 operate as a single virtual network node with unified management capabilities. A master network node, e.g. network node 110a, is selected and the local MAC address of the master network node 110 is adopted as the master MAC address for the virtual chassis system 100 by the other network nodes 110. The master MAC address is utilized by external nodes 112 to address the network nodes 110 in the virtual chassis system 100. As such, the network nodes 110 operate transparently to the external nodes 110 and are treated as a single logical device by the external nodes 112.

External nodes 112 are operable to couple to one or more network nodes 110 in the virtual chassis system 100 using a single trunk or link, a link aggregate group (LAG) 116 or virtual-chassis link aggregate groups (VC-LAG) 114. To provide increased resiliency and remove a single point or even two points of failure, VC-LAG 114 is operable to couple an external node to two or more network nodes 110 in the virtual chassis system 100. The external node can use load balancing techniques to distribute traffic across the available links of VC-LAG 114. For example, one of the physical links of the VC-LAG 114 is selected by the external node to transmit a packet based on a load-balancing algorithm (usually involving a hash function operating on the source and destination Internet Protocol (IP) or Media Access Control (MAC) address information) for a more effective use of bandwidth.

During normal operation, the network nodes 110 within the virtual-chassis system share the master MAC address for system identification by a wide variety of layer 2 and layer 3 protocols. For example, the spanning tree protocol and LACP protocols use the master MAC address as the identifier for the virtual chassis system 110. Internet Protocol (IP) routing also utilizes the master MAC address to identify the virtual chassis system 100 to external network elements in the network, e.g. peers use the master MAC address as the Ethernet destination address for packets destined to the virtual chassis system 100. As such, the network nodes 110 within the virtual chassis system 100 are viewed as a single logical node by external nodes 112. In addition, the network nodes 110 within a virtual chassis system 100 are managed as a single node with a unified administration, operations and maintenance management system.

Since the network nodes 110 within a virtual chassis system 100 are treated as a single logical device by external nodes 112, the external nodes 112 are operable to actively forward traffic on all the links of the VC-LAG 114. This feature enables multiple homing of the external nodes 112 to the network nodes 110 without requiring spanning tree protocols between the external nodes and network nodes while still facilitating a carrier-grade detection and convergence time to edge uplink failures as well as network node 110 failures. Another advantage of the active forwarding mode of all the VC-LAG 114 uplinks to the virtual chassis system 100 is increased efficiency of the use of bandwidth of the VC-LAG 114 links.

Within the virtual chassis system 100, a network node 110 is assigned a globally unique identifier called a chassis identifier or chassis ID. The network node 110 assigns an internal VFL identifier (VFID) to each of its configured VFLs 120 within the virtual chassis system 100. Since the VFID for a VFL is utilized for internal identification and configuration of VFLs 120, a network node 110 may assign the same or a different VFID to a VFL 120 as assigned by another network node 110. The VFLs 120 provide a connection for exchange of information between the network nodes 110 regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP), as described in more detail in U.S. patent application Ser. No. 13/010,168, entitled, "SYSTEM AND METHOD FOR MULTI-CHASSIS LINK AGGREGATION," filed Jan. 20, 2011. In an embodiment, synchronization of layer 2 address tables, such as medium access control (MAC) address tables, between the network nodes 110 is driven by layer 2 packet flows over the VFLs 120 as well as by a periodic keep-alive mechanism whereby the network node 110 that owns a given MAC address floods specific packets bearing such MAC address as the source address. The synchronization mechanism also needs to implement the standard MAC flushing mechanism to handle cases where a network node 110 or some of its components go down. MAC address source learning is enabled over the VFLs 120 through flooding of unknown destination MAC addresses. During source learning, the network nodes 110 exchange packets with prepended headers over the VFLs 120 that include source MAC addresses and associated hardware device information, such as source chassis ID, source network interface identifier and source port identifier information. The network nodes 110 use this information to maintain synchronized MAC address tables with minimum messaging based MAC table synchronization. Utilizing the synchronized MAC address table, the network nodes 110 are operable to process and forward packets between the network nodes 110 in the virtual chassis system 100.

Figure 1B:
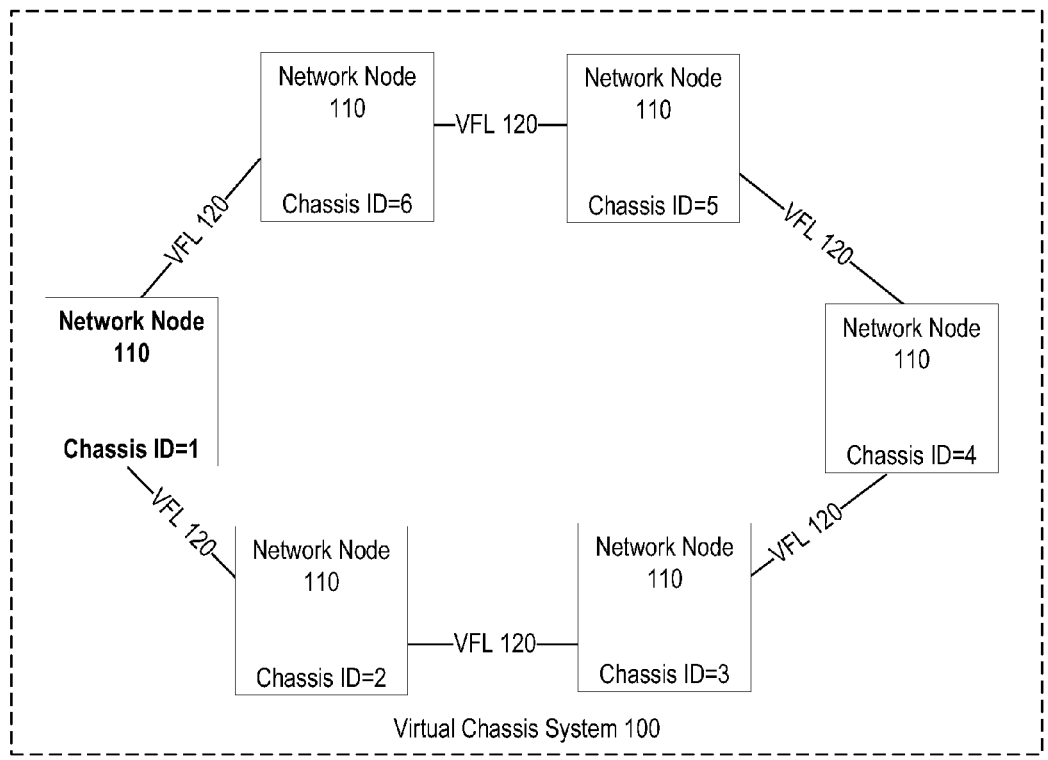
Figure 1C:
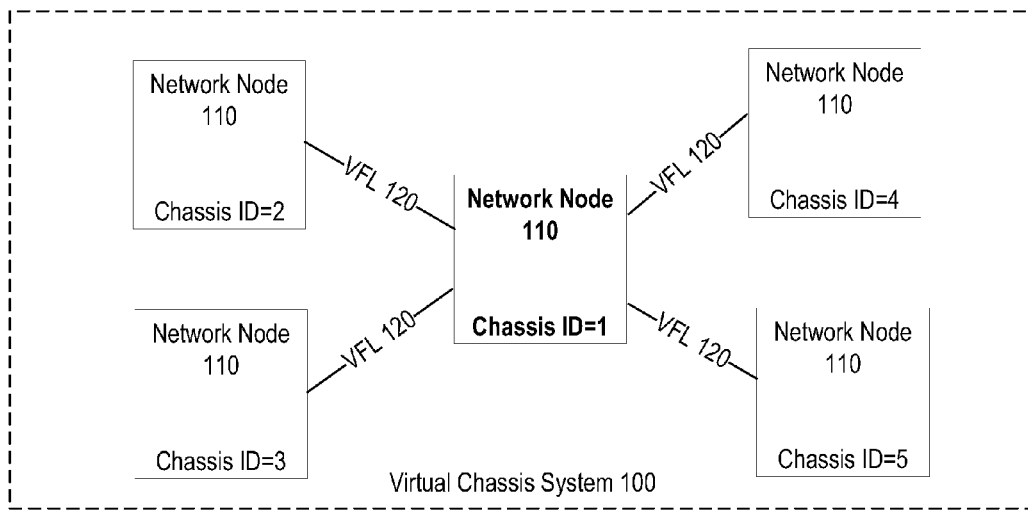

FIG. 1a illustrates that the network nodes 110 are coupled in a partial mesh network topology. However, the network nodes 110 in a virtual chassis system 100 may be coupled in any of a plurality of types of network topologies without affecting operation of the virtual chassis system 100. FIG. 1b illustrates a virtual chassis system 100 with a plurality of network nodes 110 configured in a ring network topology coupled by VFLs 120. FIG. 1c illustrates a virtual chassis system 100 with a plurality of network nodes 110 configured in a hub and spoke or star type network topology. Other network topologies not depicted, such as linear, tree, full mesh, hybrid, etc., are also be supported by the virtual chassis system 100. To support the plurality of different types of network topologies, the network nodes 110 in a virtual chassis system 100 are operable to perform a network topology discovery process.

for the other network nodes 110 (e.g., local MAC address, chassis identifier), identification information for network interfaces that host active VFLs 120 (or other active inter-switch links), identification information for the VFLs 120 and their associated member ports on the network nodes 110. The network node 110 thus learns the active connections between the network nodes 110 and configuration information of the other network nodes 110 in the virtual chassis system 100. The following Table 1 is an example of a topology database for a network node 110a, in this example with e.g. chassis ID=1, following the discovery phase. Table 1 includes exemplary information stored in the topology database but other information and data not illustrated may also be included in the topology database. In addition, the topology database may be stored in separate databases or tables or combined with other tables or databases in the network node 110.

TABLE 1

Topology Database - Chassis 1

| Local Chassis Data | Neighbor [1] | Neighbor [2] | Neighbor [3] |
|---|---|---|---|
| Chassis ID = 1 | Chassis ID = 2 | Chassis ID = 4 | Chassis ID = 3 |
| Uptime = 4 min 50 sec | Uptime = 5 min 10 sec | Uptime = 5 min 5 sec | Uptime = 5 min 1 sec |
| Priority = 100 | Priority = 100 | Priority = 100 | Priority = 100 |
| Chassis MAC = A | Chassis MAC = B | Chassis MAC = D | Chassis MAC = C |
| Chassis Group = 0 | Chassis Group = 0 | Chassis Group = 0 | Chassis Group = 0 |
| Primary CMM = CMM-A | Primary CMM = CMM-A | Primary CMM = CMM-B | Primary CMM = CMM-A |
| Chassis type = OS10K | Chassis type = OS10K | Chassis type = OS10K | Chassis type = OS10K |
| Role = unassigned | Role = unassigned | Role = unassigned | Role = unassigned |
| State = unassigned | State = unassigned | State = unassigned | State = unassigned |

FIG. 2 illustrates a logical flow diagram of an embodiment of a network topology discovery process 130 in a virtual chassis system 100. The process is performed by the active network nodes 110 in the virtual chassis system 100 at start-up, reboot, on indication of a status change in the network or at predetermined time periods. In step 132, a network node 110 detects that it is operating in a virtual chassis mode (VCM). For example, one or more parameters of the network node 110 are configured to indicate a virtual chassis mode of operation. The network node 110 detects that the parameters indicate virtual chassis mode operation (e.g., rather than stand-alone mode or multi-chassis mode). The network node 110 then performs in step 134 one or more control protocols to discover other network nodes 110 in the virtual chassis system 100 and to exchange topology and configuration information. The network node 110 uses the information to build a topology database of the virtual chassis system 100. The topology database includes: identification information In step 136 of FIG. 2, a master network node is selected to perform management and other tasks for the virtual chassis system 100. The local MAC address of the master network node is then adopted by the other network nodes 110. The following Table 2 is an example of a topology database for the elected master network node 110 with chassis ID=1. As seen in Table 2, network node with chassis ID=1 is indicated as having the master role and the other nodes are indicated as having a slave role in the topology database.

TABLE 2

Topology Database - Chassis 1

| Local Chassis Data | Neighbor [1] | Neighbor [2] | Neighbor [3] |
|---|---|---|---|
| Chassis ID = 1 | Chassis ID = 2 | Chassis ID = 4 | Chassis ID = 3 |
| Uptime = 5 min 50 sec | Uptime = 6 min 10 sec | Uptime = 6 min 5 sec | Uptime = 6 min 1 sec |
| Priority = 100 | Priority = 100 | Priority = 100 | Priority = 100 |
| Chassis MAC = A | Chassis MAC = B | Chassis MAC = D | Chassis MAC = C |
| Chassis Group = 0 | Chassis Group = 0 | Chassis Group = 0 | Chassis Group = 0 |
| Primary CMM = CMM-A | Primary CMM = CMM-A | Primary CMM = CMM-B | Primary CMM = CMM-A |
| Chassis type = OS10K | Chassis type = OS10K | Chassis type = OS10K | Chassis type = OS10K |
| Role = master | Role = slave | Role = slave | Role = slave |
| State = running | State = running | State = running | State = running |

The selection of a master network node 110 is based on a prioritized list of parameters including chassis priority, up time, chassis ID and chassis MAC address. The parameter of up time gives priority to network nodes 110 in operation for longer periods of time. The parameter of chassis priority is a user configured priority that defines the user preference of a master network node 110 regardless of chassis ID or up time. The use of various parameters adds flexibility to the selection of a master network node 110. The chassis group parameter shown in the topology database identifies the virtual chassis system 100. One or more additional virtual chassis systems 100 with different chassis group identifications may also be operable in a network. The topology database also identifies the active or primary control manager modules (CMM) in a network node 110 and the chassis type of the network node 110.

In step 138 of the network topology discovery process 130, the network node 110 performs one or more protocols to monitor the state or status of the connections and the network nodes 110 in the virtual chassis system 100. The current state of the network nodes 110 is maintained in the topology database. A detected status change in a network node 110 in the virtual chassis system 100 may initiate a change in routing, a change in the master node, etc. Through topology self-discovery and monitoring of the network nodes 110, the virtual chassis system 100 is operable to support a plurality of different types of network topologies with minimum pre-configuration and intervention.

FIG. 3 illustrates an example of topology databases 144 in network nodes 110 in a virtual chassis system 100 after selection of a master network node 110. In this example, network node 110*a* is adopted as the master network node and network nodes 110*b* and 110*c* are slave nodes. The local MAC address of network node 110*a* (e.g., master MAC address=A) is adopted by the network nodes 110*a-c* as the virtual chassis MAC address. In addition, the master MAC address (MAC=A) is adopted as the application MAC address for management applications.

Figure 4:
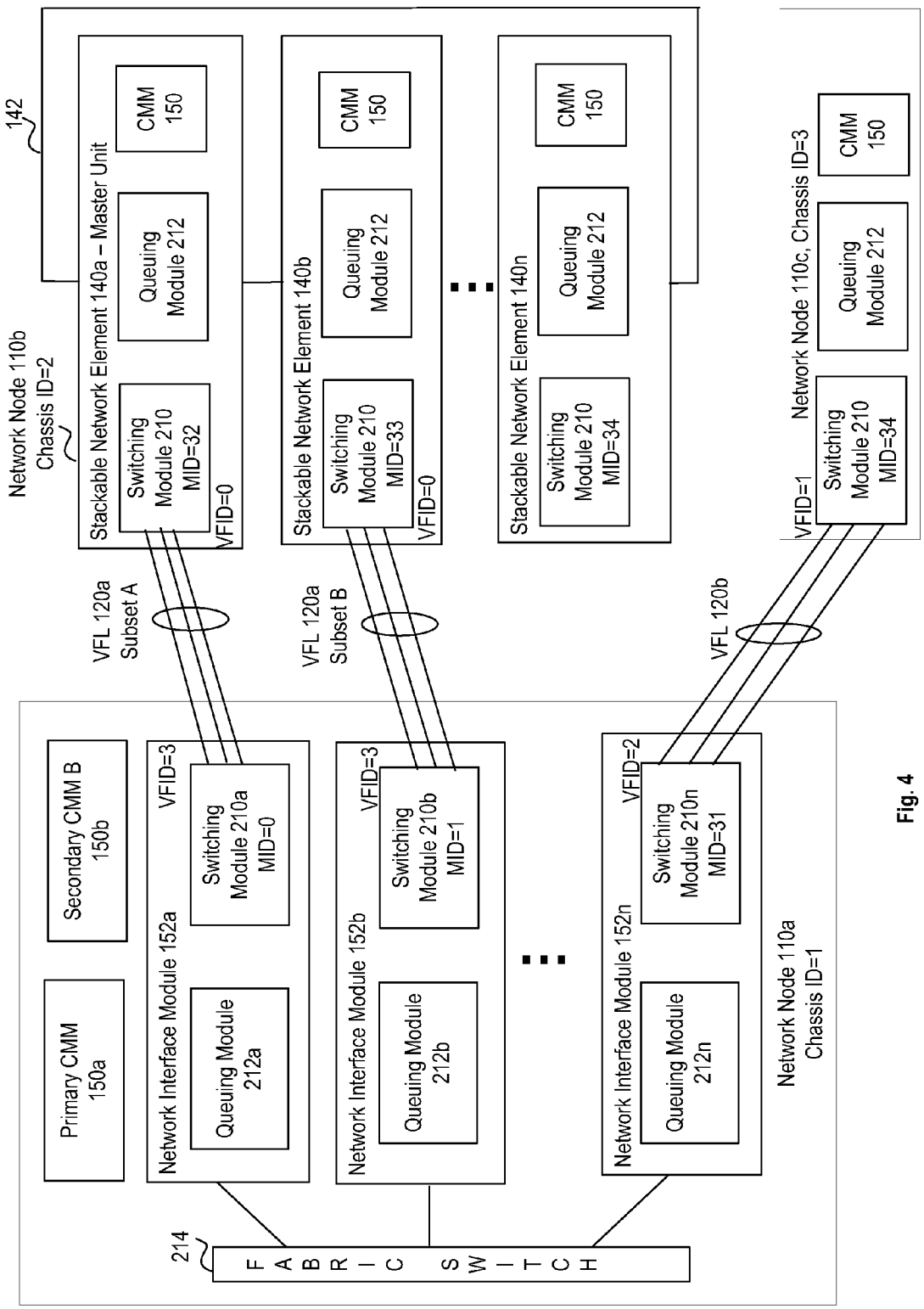
FIG. 4 illustrates a schematic block diagram of an embodiment of network nodes in a virtual chassis system in accordance with the present invention.

The virtual chassis system 100 is also operable to include network nodes 110 with one or more different types of node architectures, such as single module, stackable, or multi-slot chassis-based architectures. FIG. 4 illustrates a schematic block diagram of an embodiment of network nodes 110 in a virtual chassis system 100 with different types of node architectures. In this example, network node 110*a* has a multi-slot chassis-based architecture with a plurality of network interface modules 152*a-n*. In general, multi-slot chassis-based architectures share one enclosure, control manager modules (CMMs) 150*a-b* and a common power supply with one or more network interface modules (NIMs) 152*a-n*, such as line cards or port modules. The network interface modules 152*n* include a queuing module 212 and switching module 210 and are connected by a fabric switch 214 integrated into the backplane of the chassis.

Network node 110*b* in this example has a stackable node architecture and includes a plurality of network elements 140*a-n* coupled by backplane connections 142. Each network element 140*a-n* is operable as a stand-alone node and includes its own enclosure, control manager module (CMM) 150, switching module 210, queuing module 212 and power supply. In some stack architectures, one network element (Network Element 140*a* in this example) is designated as the main or master unit of the stack for management purposes.

Network node 110*c* has a single module node architecture, such as a single stackable element 140 or alternatively, a multi-slot chassis-based architecture with a single network interface module 152.

Network nodes 110*a-c* correspond to one or more of the network elements 110 in virtual chassis system 100 in FIGS. 1*a-c*. For example, virtual chassis system 100 is operable to include network nodes 110 with only multi-slot chassis-based node architectures or include network nodes 110 with only stackable node architectures or include a combination of network nodes 110 with two or more types of node architectures, such as multi-slot chassis-based architectures, stackable node architectures and single module node architectures. Though not shown, the virtual chassis system 100 may also include network nodes 110 comprised of other types of node architectures and configurations.

Network node 110*a* and network node 110*b* are operably coupled by VFL 120*a*. The network nodes 110*a* and 110*b* designate VFL 120*a* with an internal VFL identifier (VFID), such as VFID=3 for network node 110*a* and VFID=0 by network node 110*b* as shown in FIG. 3. Network node 110*a* and network node 110*c* are operably coupled by VFL 120*b*. The network nodes 110*a* and 110*c* designate VFL 120*b* with an internal VFL identifier (VFID), such as VFID=2 for network node 110*a* and VFID=1 by network node 110*c* as shown in FIG. 3. In addition, the network nodes 110*a-c* are also operable to be coupled by additional VFL 120*s* to one or more other network nodes 110 as shown in FIGS. 1*a-c*. The VFL 120*a* between network nodes 110*a* and 110*b* is described below as a generalization of the operation and configuration of the VFLs 120 between the various network nodes 110 in a virtual chassis system 100.

VFL 120*a* between network node 110*a* and network node 110*b* is operably coupled to one or more VFL member ports in one or more switching modules 210. For redundancy in case of failure of one or more ports, links or modules, VFL 120*a* is operable to include a plurality of aggregate links generated using the LACP or similar aggregate protocol between different switching modules 210 of the network nodes 110*a* and 110*b*. For example, in FIG. 4, VFL 120*a* includes a first subset A of physical links between NIM 152*a* of network node 110*a* and stackable network element 140*a* of network node 110*b* and a second subset B of physical links between NIM 152*b* of network node 110*a* and stackable network element 140*b* of network node 110*b*.

The network nodes 110 are assigned a unique chassis identifier in the virtual chassis system 100. The chassis ID for each network node 110 is unique and global and through the topology discovery, the network nodes 110 are aware of the chassis ID of its peer network nodes 110 in the virtual chassis system 100. In addition, unique hardware device identifiers or module identifiers (MIDs) for various components, such as the switching modules 210 and port interfaces in the network nodes 110, are generated allowing for management of local and remote objects. In an embodiment, the hardware device identifiers MIDs for the switching modules 210 have global significance within the virtual chassis system while MIDs for other components, such as queuing modules 212, may have only local significance. For example, the hardware device identifiers' assigned to the switching modules 210 are known by other network nodes 110 while hardware device identifiers for other devices are restricted to a local network node 110 and have no significance to other network nodes 110. For example, the port interfaces of a switching module 210 are assigned a global unique hardware device identifier that includes the chassis ID, switching module ID and port interface ID. In an embodiment, the network nodes 110 in the virtual chassis system operate in a pre-pended header mode to exchange data and control packets over the VFLs 120.

Figure 5:
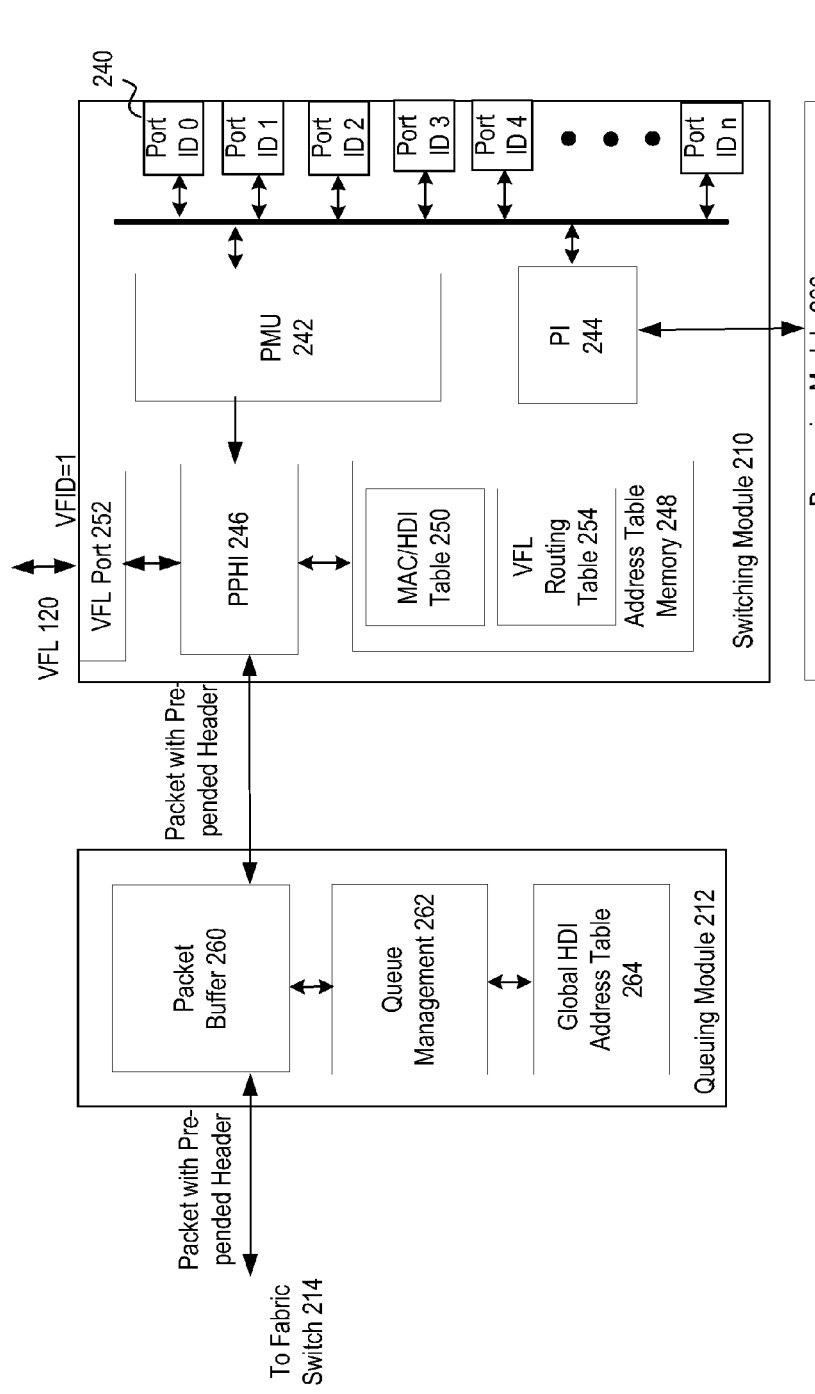
FIG. 5 illustrates a schematic block diagram of an embodiments of a network interface module of a network node in a virtual chassis system in accordance with the present invention.

FIG. 5 illustrates a schematic block diagram of an embodiment of a network interface module (NIM) 152 operating in a prepended header mode in more detail. Though a network interface module 152 is illustrated, a stackable network element 140 or single module network element is operable to perform similar functions for operating in a prepended header mode. Switching module 210 includes a plurality of external ports 240 that are connected to external nodes 112 from the virtual chassis system 100. One or more of the external ports 240 may include member ports for a VC-LAG 114, LAG 116, single trunk or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned external port interface identifiers (Port ID), e.g., device port values, such as gport and dport values, associated with the switching module 210. In an embodiment, the chassis ID of the network node 110, the MID of the switching module 210 and the external port interface identifier (Port ID) are used as a global unique identifier of a physical external port interface 240 in a network node 110 in the virtual chassis system 100.

When a packet is received on an external port interface 240, switching module 210 transfers the packet to a pre-pended packet header interface (PPHI) 246 that adds a pre-pended header (or otherwise modifies the packet header) to include hardware device information (HDI) associated with the source and/or destination MAC address of the packet. In an embodiment, the pre-pended header may include other information such as packet priority and load balance identifiers. To obtain HDI information associated with the MAC address of the packet, the PPHI performs a look-up process in MAC/HDI forwarding table 250. The MAC/HDI forwarding table 250 stored in the address table memory 248 includes a list of MAC addresses and associated hardware device information. The hardware device information uniquely identifies a network node 110, switching module 210 and/or a port interface 240 for routing the packet. The hardware device information includes, for example, chassis ID, MID of a switching module 210 and port interface ID of an external port interface 240 associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the queuing module of the NIM 152 or other module as well.

Based on the topology database 144, a VFL routing configuration table 254 is generated at a network node 110 to determine routing of unicast traffic. The VFL routing configuration table 254 includes a chassis ID and an associated VFL ID (VFID). The VFID associated with the chassis ID identifies a VFL 120 in the virtual chassis system 100 for routing the packet to a network node 110 identified by the destination chassis ID. In an embodiment, the VFL routing configuration table 254 is generated using a shortest path algorithm, traffic based algorithm or other type of routing algorithm. An example of VFL routing configuration tables 254 for the virtual chassis system 100 shown in FIG. 1a is illustrated below in Table 3.

TABLE 3

| Destination Chassis ID | Outgoing VFL ID | Destination Chassis ID | Outgoing VFL ID |
|---|---|---|---|
| VFL Routing Configuration on Chassis 1 | | VFL Routing Configuration on Chassis 2 | |
| 1 | N/A (local) | 1 | 0 |
| 2 | 3 | 2 | N/A (local) |
| 3 | 2 | 3 | 3 |
| 4 | 2 or 1 | 4 | 3 or 1 |
| 5 | 1 | 5 | 1 |
| 6 | 0 | 6 | 0 or 1 |

TABLE 3-continued

| Destination Chassis ID | Outgoing VFL ID | Destination Chassis ID | Outgoing VFL ID |
|---|---|---|---|
| VFL Routing Configuration on Chassis 3 | | VFL Routing Configuration on Chassis 4 | |
| 1 | 1 | 1 | 0 or 1 |
| 2 | 0 | 2 | 0 or 1 |
| 3 | N/A (local) | 3 | 1 |
| 4 | 3 | 4 | N/A (local) |
| 5 | 3 or 2 | 5 | 0 |
| 6 | 2 | 6 | 0 or 1 |
| VFL Routing Configuration on Chassis 5 | | VFL Routing Configuration on Chassis 6 | |
| 1 | 2 | 1 | 0 |
| 2 | 1 | 2 | 0 or 1 |
| 3 | 1 or 0 | 3 | 1 |
| 4 | 0 | 4 | 1 or 2 |
| 5 | N/A (local) | 5 | 2 |
| 6 | 1 | 6 | N/A (local) |

Though the MAC/HDI forwarding table 250 and VFL routing table 254 are illustrated as separate tables in address table memory 248, the tables may be combined or data included from one of the tables into the other table or the tables may be separated into one or more other tables.

In an embodiment, the hardware device information HDI in the pre-pended header of a packet includes the outgoing VFID for the VFL port 252 associated with the destination chassis ID, as shown in Table 3. The pre-pended header also includes hardware device information HDI associated with the source port receiving the packet, such as the port interface ID, MID of the switching module 210 and chassis ID. Additional information, such as VLAN ID, packet type (multicast, unicast, broadcast), packet priority and load balance identifier is also added to the pre-pended header in an embodiment.

The packet with the pre-pended header is then transmitted to the queuing module 212 for routing over the fabric switch 214. Based on the VFL routing configuration table 254, the queuing module 212 routes the packet with the pre-pended header to the switching module 210 connected to the outgoing VFL 120.

The queuing module 212 includes a packet buffer 260, a queue management 262 for providing traffic and buffer management and a global HDI address table 264. The global HDI address table 264 maps the outgoing VFL ID to the appropriate queues in queuing modules 212 in one or more of the other NIMs 152. For example, the queuing module 212 switches the packet to an appropriate egress queue for one or more of the VFL port interfaces 252 for transmission over the outgoing VFL 120. In an embodiment, a determination of the egress queue corresponding to a particular VFL port interface is operably based on a load balance identifier in the pre-pended header.

Though the switching module 210 and queuing module 212 are illustrated as separate integrated circuits or modules, one or more functions or components of the modules may be included on the other module or combined into an alternate module or otherwise be implemented in one or more integrated circuits.

Figure 6:
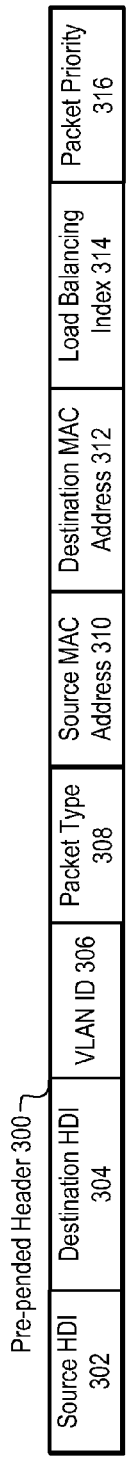
FIG. 6 illustrates a schematic block diagram of an embodiment of a pre-pended header of a packet in the virtual chassis system in accordance with the present invention.

FIG. 6 illustrates a schematic block diagram of an embodiment of a pre-pended header of a packet in the virtual chassis system 100. The pre-pended header 300 includes fields for source HDI 302, destination HDI 304, VLAN ID 306, packet type 308, source MAC address 310 and destination MAC address 312. In an embodiment, the pre-pended header may also include, load balance identifier 314 and packet priority 316. The destination HDI 304 includes, for example, the port identifier (either device port (dport) and/or global port value (GPV)), MID of switching module 210 and chassis ID of the destination network node 110 associated with the destination MAC address. The source HDI 302 includes, for example, the port identifier (either device port (dport) and/or global port value (GPV)), MID of switching module 210 and chassis ID of the source network node associated with the source MAC address. The load balance identifier 314 is utilized by the queuing module 212 to determine a VFL member port for transmission of the packet over the outgoing VFL 120. The packet priority 316 is utilized by the queuing module 212 to determine the specific priority queue. Additional or alternative fields may also be included in the pre-pended header 300 with similar or additional information.

Figure 7:
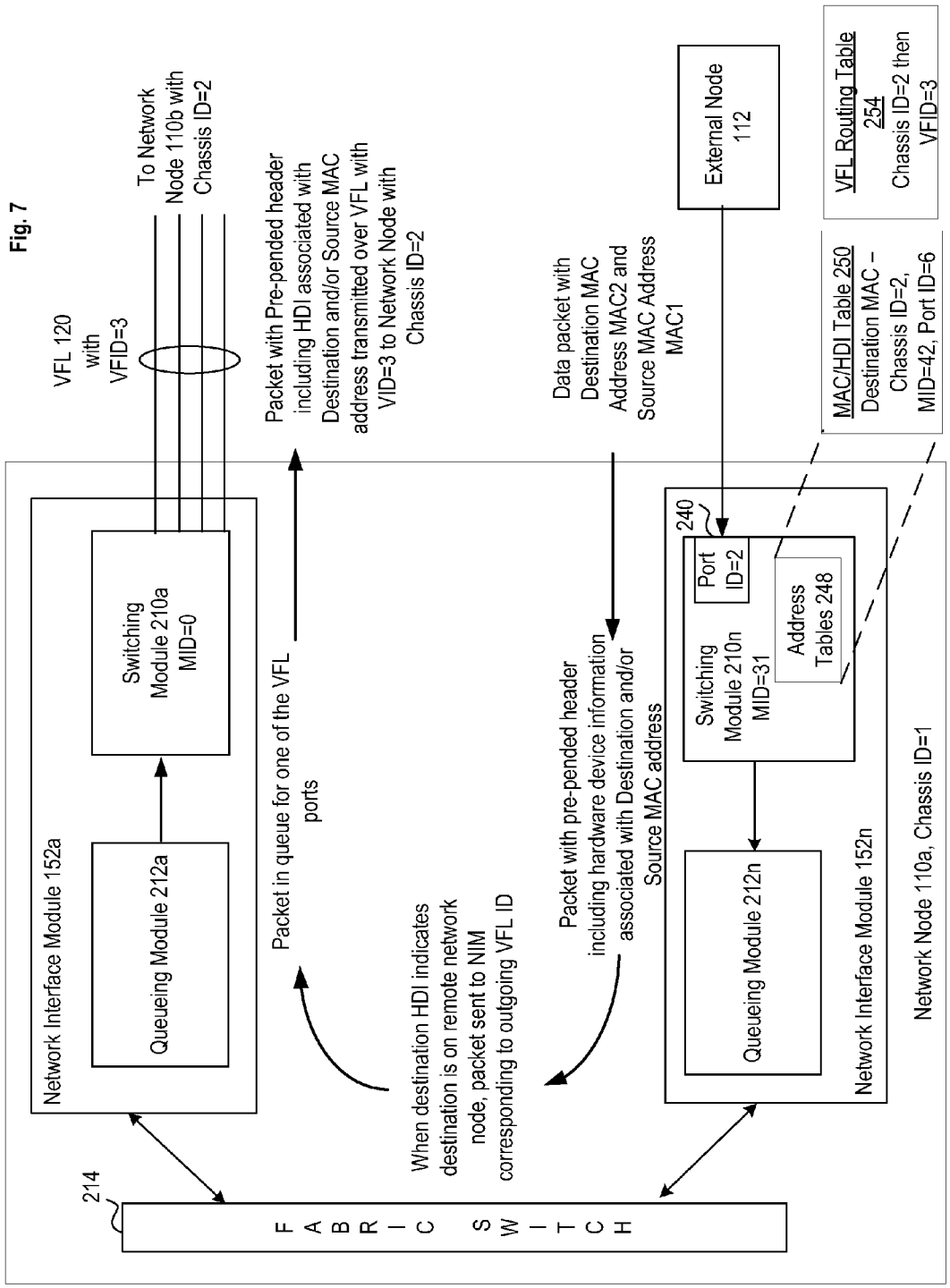
FIG. 7 illustrates a schematic block diagram of an embodiment of packet flow through a network node in a virtual chassis system in accordance with the present invention.

FIG. 7 illustrates a schematic block diagram of an embodiment of a packet flow through a network node 110a to another network node 110b in a virtual chassis system 100. In this example, an external node 112 with source MAC address "MAC1" transmits a data packet with a destination MAC address "MAC2". Network node 110a, with Chassis ID=1 in this example, receives the packet at external port interface 240, e.g. with port ID=2 on switching module 210n, e.g. with MID=31. The switching module 210n extracts the destination MAC address MAC2 and performs an address table look-up in MAC/HDI forwarding table 250 to determine hardware device information (HDI) associated with the destination MAC address MAC2. The destination HDI includes, e.g., destination chassis ID and device module identifier (MIDs) and port identifiers associated with the destination MAC address. The destination HDI may also include identifiers of one or more other network nodes or hardware modules in a path to the destination device associated with the destination MAC address. When the destination MAC address is associated with another network node, e.g. destination chassis ID is not the local chassis ID, the switching module 210 determines an outgoing VFL ID associated with the destination chassis ID. The outgoing VFL ID may be added to the destination HDI in the pre-pended header. For the example in FIG. 5, the VFL routing table 254 indicates that the destination chassis ID=2 is associated with VFL 120 having VFID=3.

The switching module 210n also includes in the prepended header source hardware device information (HDI) associated with the originating external port interface, e.g. port ID=2. The source HDI may include one or more hardware device identifiers, such as MID of the originating switching module 210, source port identifier, MID for source NIM 152, source chassis ID, etc. Furthermore, in an embodiment, the pre-pended header includes a packet priority and a load balance identifier determined based on parameters retrieved from the original packet (source MAC address, destination MAC address, source IP address, destination IP address).

The packet with pre-pended header is transmitted to the queuing module 212n which then determines a NIM 152 on the network node 110 to transmit the packet based on the destination HDI. When the destination HDI indicates a local external port interface on the network node (e.g. based on the destination MID contained in the pre-pended header), the queuing module places the packet in an egress queue for transmission to the corresponding NIM 152 of the local external port interface. In another example illustrated in FIG. 5, when the destination HDI indicates that the packet needs to be transmitted over a VFL 120 to another network node 110 in the virtual chassis system 100, the queuing module determines from the VFL ID the outgoing NIM 152 to transmit the packet. In this example, the queuing module determines that VFID=3 is operably coupled to NIM 152a and transmits the packet with pre-pended header over the fabric switch 214 to NIM 152a. When multiple switching modules 210 are operably coupled to the outgoing VFL 120, the traffic to be transmitted may be distributed between the multiple switching modules 210 in a load balancing method. In addition, the selection of a VFL member port (high priority queue, low priority, etc.) on a switching module 210 is operably based on load balance identifier parameters carried on the pre-pended header. The queuing module 212a on NIM 152a receives the packet with pre-pended header and queues the packet for transmission over VFL 120 with VFID=3. The switching module 210a then transmits the packet with pre-pended header including the source and/or destination HDI to the network node 110b, chassis ID=2 over the VFL 120 with VFID=3.

In an embodiment, the switching module 210a may alter the pre-pended header prior to transmission over the VFL 120. For example, the switching module 210a may translate a destination HDI with local significance (e.g., a gport value or local hardware device identifier MID) to an HDI with global significance or remove the outgoing VFID from the pre-pended header.

In an embodiment, the MAC/HDI forwarding tables 250 in the NIMs 152 are populated and updated in response to layer 2 packet flows through the virtual chassis system 100. Since the pre-pended header includes source MAC address and source HDI information, the NIMS 152, e.g. in specific the switching modules 210 in an embodiment, are able to populate the MAC/HDI forwarding table 250 with this information. By operating in a pre-pended header mode to exchange Layer 2 packets with source MAC addresses and source HDI over the VFL 120, the switching modules 210 are able to synchronize the MAC/HDI forwarding tables 250 between the network modules 110 in a virtual chassis system 100. Though the MAC/HDI forwarding table 250 and VFL routing table 254 are described as located in the switching modules 210, the tables may be included, alternatively or in addition to, in the queuing modules 212n or other module of the network node 110. In another embodiment, the CMM 150 (primary and secondary) may also include the MAC/HDI forwarding table 250 and VFL routing table 254.

Figure 8:
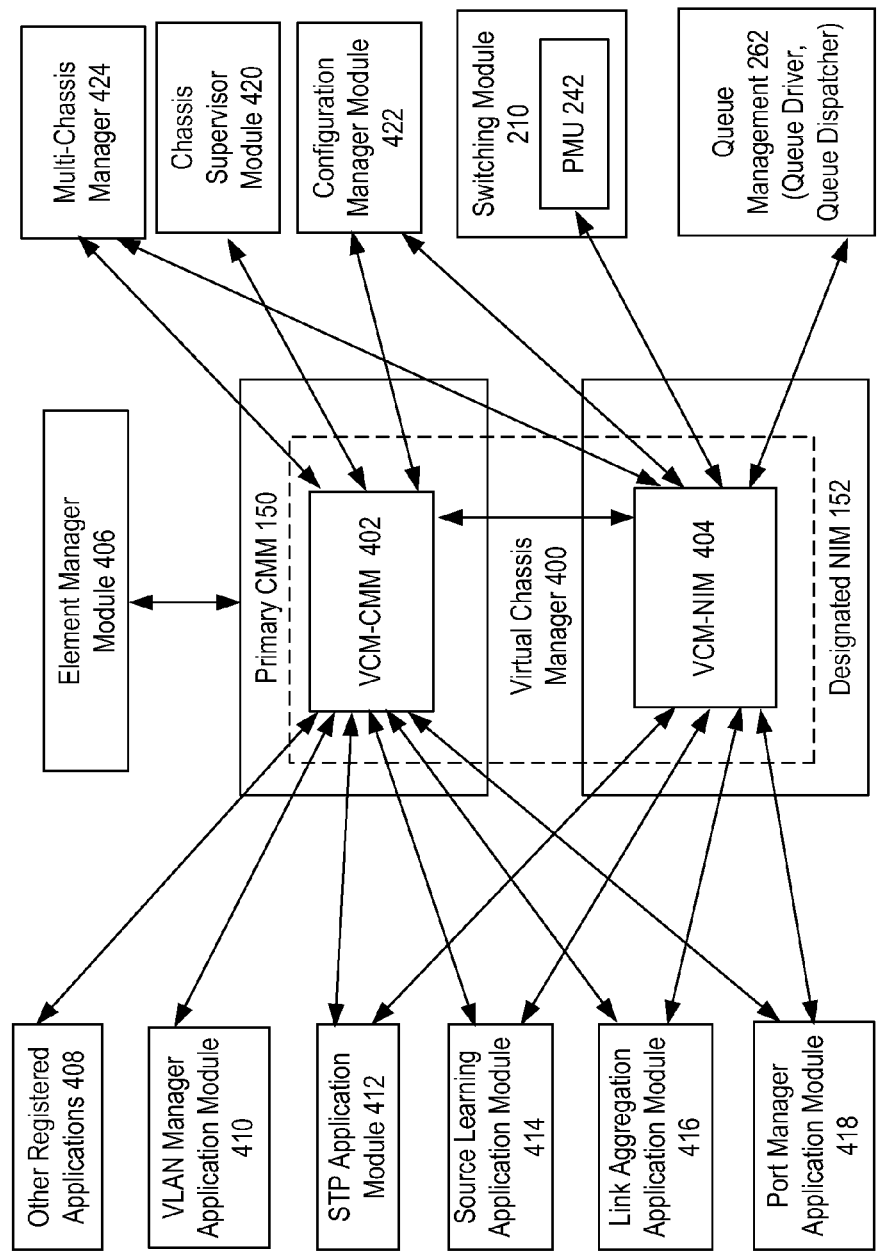
FIG. 8 illustrates a schematic block diagram of an embodiment of a virtual chassis manager application in accordance with the present invention.

FIG. 8 illustrates a schematic block diagram of an embodiment of a virtual chassis manager application 400 operable in the network nodes 110 in the virtual chassis system 100. In an embodiment of a network node 110 with a multi-slot chassis based node architecture, the virtual chassis manager application 400 includes a distribution of functionality between the central management module (CMM) 150 of the network node 110 (called VCM-CMM 402) and a processing module 266 in a designated network interface module (NIM) 152 of the network node (called VCM-NIM 404). In a stackable node architecture, a designated or master stackable network element 140 operates the VCM-NIM 404. Use of a designated NIM 152 or stackable element 140 avoids centralizing the functions of the VCM application 400 only at a CMM 150. An example of a distribution of functionality of the virtual chassis manager application 400 is shown in Table 4.

TABLE 4

| VCM-CMM 402 | VCM-NIM 404 |
|---|---|
| Element and network management interface to the virtual chassis functionality | Control protocol state machines Service interfaces with other software components, i.e. interfaces used by the VCM application 400 to provide or request |

TABLE 4-continued

| VCM-CMM 402 | VCM-NIM 404 |
|---|---|
| Coordination of the virtual chassis operation and states from a network node overview | services to/from other software components. Programming of the underlying switching module devices: global module identifiers (MID), loop prevention, virtual chassis inter-process communication infrastructure, VFL member port programming, etc. |

In an embodiment, the VCM-CMM 402 includes an interface between the virtual chassis manager application 400 and element and/or network manager module 406 as well as an interface to other applications 408 registered with VCM 400 operable on the network node 110. The virtual chassis manager application 400 informs the registered applications 408 when to operate in the virtual chassis mode. More generally, the virtual chassis manager application 400 provides a wide range of notifications to inform interested applications about the status of the virtual chassis system both in the context of the local node and other network nodes 110 in the virtual chassis system 100. Some of the status information is driven by management configuration, whereas other status information is triggered by runtime decisions taken by the network node individually or by a plurality of the network nodes 110 within the virtual chassis system upon control data exchange, negotiation and agreement. The virtual chassis manager application 400 also interfaces with the VLAN Manager Application module 410, Spanning Tree Protocol (STP) application module 412, Source Learning application module 414, Link Aggregation application module 416 and Port Manager application module 418 for the purposes of requesting services from these system components. For example, the VCM Application may request VLAN Manager to configure a VFL member port as a member of the a control VLAN in order to allow the set-up of an inter-process communication channel between the network nodes 110 in the virtual chassis system 100.

The VCM-NIM 404 performs module identification configuration (e.g. MID) of hardware modules. The VCM-NIM 404 also interfaces with the queue management 262 in queuing modules 212 to perform hardware device/queue mapping functions and inter-chassis loop avoidance functions. The VCM-NIM 404 also includes virtual chassis state functionality for the control and management of the VFLs 120. Virtual Fabric Link Control manages and configures the VFLs 120 and interfaces with the port manager application module 418 to monitor and/or control the state of the VFLs 120 and their corresponding member ports. It also tracks and updates the status of the VFLs 120. The VCM-NIM 404 tracks the state of each VFL member port using the standard LACP protocol, or other similar protocol, along with the state of the link at the physical level. In addition to the LACP protocol, a virtual chassis status protocol performs periodic keep-alive checks (hello protocol) in order to check the status and/or operability of components running on the designated NIM on both virtual chassis switches. All virtual chassis protocol packets must be assigned a high priority in the system to avoid false/premature failure detection because such a premature detection of failure may have a very disruptive effect in the system. By running the virtual chassis status protocol on a primary designated NIM 152, the back-up designated NIM module is able to assume control of the status protocol processing in the event of failure.

The VCM-CMM 402 and the VCM-NIM 404 register with port manager application module 418 to receive port state and link state events about the member ports and links of the VFLs 120. In another embodiment, the virtual chassis manager application 400 may include a port manager application module to monitor the port and link state of the VFLs 120. The virtual chassis manager application 400 tracks the operational state of VFLs 120 and processes events about the VFL status, i.e. aggregate created/deleted/up/down. The port manager application module 418 provides link state notifications to both the VCM-CMM 402 and VCM-NIM 404.

In an embodiment, a transport control protocol is implemented in a virtual chassis system 100 to transport control protocol packets between designated NIMs 152 or stackable network elements 140 of network nodes 110. The transport control protocol is operable in the network nodes 110 with different node architectures. For a multi-slot chassis based node architecture, a designated NIM 152 with a designated processing module 266 operates the transport control protocol, e.g. as part of the VCM-NIM 404. In a stackable node architecture, a designated or master stackable network element 140 operates the transport control protocol.

Chassis supervisor module 420 provides an interface to hardware of the network node 110 and controls monitoring and boot-up or restart of the various application modules, controls software reloads and software upgrades (such as in-service software upgrades ISSUs), providing a command line interface (CLI) for the element manager module 406 and controls access to status or image files of system of the network node 110. During virtual chassis mode, the chassis supervisor module 420 controls boot sequence, controls software reloads and ISSUs and provides an interface for accessing virtual chassis parameters.

Configuration manager module 422 is operable to convert operation of the network node 110 from a virtual chassis mode to a standalone mode or convert a network node 110 from a standalone mode to a virtual chassis mode. Configuration manager module is also operable to configure the virtual chassis manager 400 and multi-chassis manager 424. The operation of the configuration manager module 422 and operation states of a network node 110 are described in more detail below.

The network nodes 110 in a virtual chassis system 100 may operate in a plurality of operation modes, including virtual chassis mode, standalone mode and multi-chassis (MC-LAG) mode. Various parameters and configurations are modified depending on the operation mode. Table 5 illustrates the assignment of chassis IDs to network nodes 110 depending on the mode of operation.

TABLE 5

| Operation Mode | Minimum Chassis ID | Maximum Chassis ID |
|---|---|---|
| Standalone | 0 | 0 |
| Multi-Chassis (MCLAG) | 1 | 2 |
| Virtual-Chassis | 1 | N |

In standalone mode, a network node 110 is operated as a single node and utilizes its configured local MAC address rather than a global Virtual Chassis MAC address. In multi-chassis mode, two network nodes are configured as virtual nodes whose MAC forwarding tables and ARP tables are synchronized, but they still operate as separate bridges and routers, each of them using their own local chassis MAC address, as described in more detail in U.S. patent application Ser. No. 13/010,168, entitled, "SYSTEM AND METHOD FOR MULTI-CHASSIS LINK AGGREGATION," filed Jan. 20, 2011. In virtual chassis mode as described herein, a plurality N of network nodes are configured as virtual chassis nodes in a virtual chassis system 100. A globally unique chassis ID from 1 to N is assigned to each of the plurality of network nodes in the virtual chassis system 100.

In addition to standalone mode, multi-chassis mode and virtual chassis mode, a network node 110 is also operable in a pass thru mode in the virtual chassis system 100. In pass thru mode, a network node 110 receives packet flows over a VFL 120 and forwards the packet flows over another VFL 120 to another network node in the virtual chassis system 100. However, the network node 110 disables any other external port interfaces 240, such as external port interfaces 240 connected to external nodes 112. The network node 110 in pass thru mode forwards data packet flows over VFLs between network nodes 110 transparently without modifying the prepended headers. It also is operable to receive management commands issued from an element manager or issued from the master network node and transmitted over a VFL 120 to the network node 110. Thus, a network node 110 in pass thru mode can still be managed through management commands and is operable to transparently forward data packets between network nodes 110 over VFLs 120 but is not operable to receive or transmit data packets over port interfaces 240 to or from external nodes 112.

A network node 110 may be placed into pass thru mode for one or more reasons, such as a hardware or software failure, duplicate chassis identifiers among the network nodes 110, an excess of network nodes 100, mismatch or inconsistency between some relevant configuration parameter or upon user request via an explicit management command. The pass thru mode of a network node 110 provides a mechanism to prevent a virtual chassis split or connection failure between network nodes 110 in the virtual chassis system 120 while still allowing an element manager or master network node to monitor and issue a minimum set of configuration commands to the network node 110.

FIG. 9 illustrates a logical flow diagram of an embodiment of a method 500 for pass thru mode of a network node 110 in a virtual chassis system 100. In step 502, a network node 110 receives a management command to enter pass thru mode. The management command may be issued by a network or element manager or issued by the master network node in the virtual chassis system 100. The network node 110 receives the management command over a VFL 120 and configures its state to pass thru mode. This step 502 is described in more detail with respect to FIG. 11 herein. In step 504, the network node 110 in pass thru mode enables one or more VFL member ports to forward certain packet flows on one or more VFLs 120. For example, the network node 110 enables data packet flows between a first network node 110 and a second network node over VFLs 120. In an embodiment, a data packet that enters one VFL 120 is forwarded automatically to another VFL 120 without modifying the prepended header of the packet. In addition, the network node 110 in pass thru mode receives management commands over one or more VFLs 120. For example, a network or element manager is still operable to manage the network node 110 in pass thru mode by issuing management commands that are transmitted to the network node 110 by the master network node over a VFL 120. In step 506, the network node 110 in pass thru mode disables other external port interfaces 240 connected to one or more external nodes 112.

FIGS. 10a-d illustrates schematic block diagrams of embodiments of virtual chassis systems 100. The determination of whether to place a network node 110 in a virtual chassis mode depends on the virtual chassis topology. In an embodiment, a network node 110 stores the virtual chassis topology in topology database 144 as described herein. Based on the topology database 144, a network node 110 is operable to determine paths between the network nodes 110 in the virtual chassis system 100, e.g. as computed in the VFL routing tables 254. As such, the network nodes 110 are operable to determine VFL connections between the network nodes 110 and shortest paths between any pair of network nodes 110. In an embodiment, the determination of whether to place a network node 110 in a pass thru mode depends on placement of the network node 110 in the virtual chassis topology.

Figure 10A:
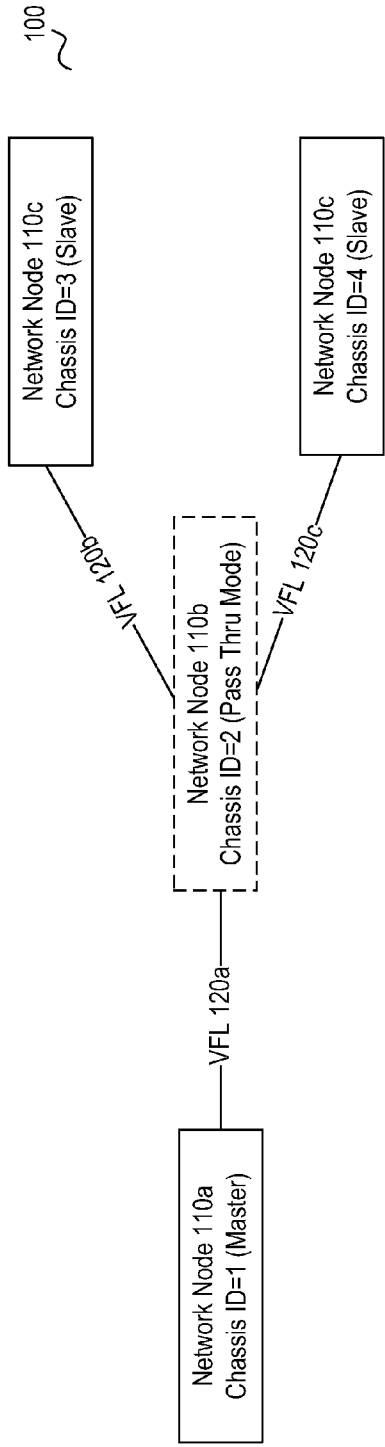
FIGS. 10a-d illustrate schematic block diagrams of embodiments of virtual chassis systems in accordance with the present invention.

For example, in FIG. 10a, network node 110b is placed in a pass thru mode (rather than, e.g. shut down mode) because it is part of a single path between network nodes 110a, 110b and 110c. No other path connects network nodes 110a, 110b and 110c. If network node 110b is placed in shut down mode, network nodes 110a, 110b and 110c would not be able to communicate in the virtual chassis system 100. The virtual chassis system 100 would be split into two or more subsets of network nodes. This condition is referred to as a virtual chassis split or fracture. When a virtual-chassis topology is split, the virtual chassis system 100 faces problems ranging from duplicate MAC addresses, duplicate configurable resources (e.g. IP interfaces), connectivity loss, loss of management access, and instabilities due to multiple node reset events. In this example of FIG. 10a, network node 110b in pass thru mode is enabled to switch data packets and control packets over VFLs 120a, 120b and 120c between network nodes 110a, 110b and 110c. However, other external port interfaces 240 to external nodes 112 are disabled to prevent other traffic from entering the network node 110b. In this example of FIG. 10a, network node 110a is the master network node. In an embodiment, a network node 110b in a pass thru mode is not operable as the master network node. Network nodes 110 whose role is slave or which have an unassigned role (e.g., early stages of node bring up) are operable to transition to a pass thru mode.

Figure 10B:
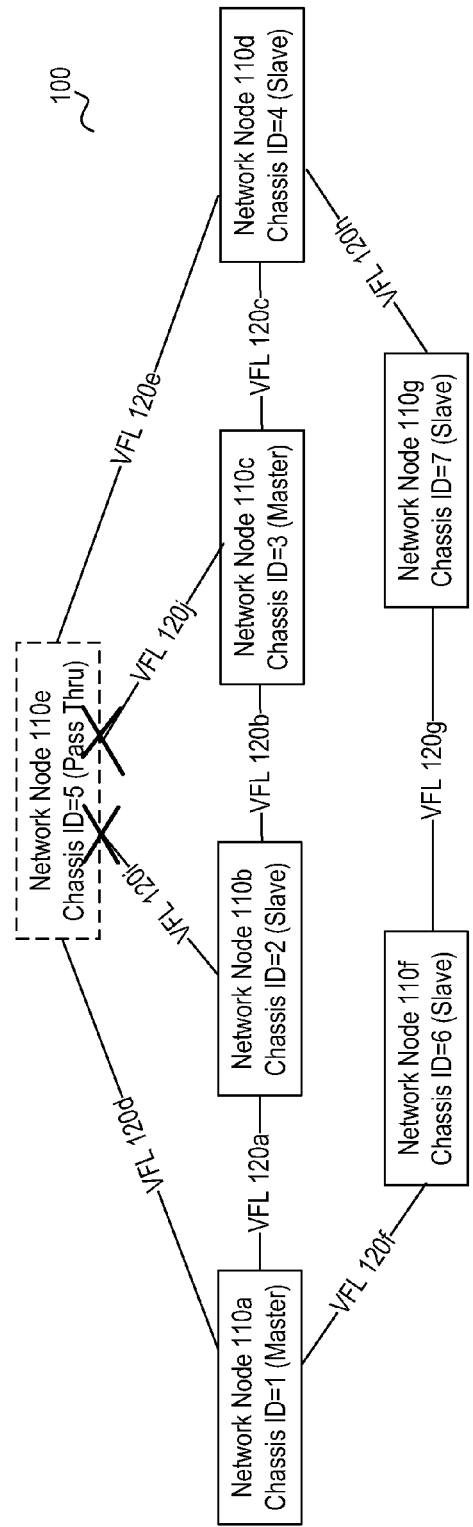

FIG. 10b illustrates a schematic block diagram of another embodiment of a virtual chassis system 100. In this example, network node 110e is placed in a pass thru mode (rather than, e.g. shut down mode) because the network node is part of a shortest path between network nodes 110a and 110d. Though other paths exist between network nodes 110a and 110d in the virtual chassis system 100, the path between network node 110a and network node 110d that includes network node 110e has the shortest hop count. Thus, in an embodiment, the network node 110e is placed into pass thru mode to forward packets between network node 110a and network node 110d over VFLs 120d and 120e. However, since alternate routes with a similar hop count are available to connect network nodes 110b and network node 110c to the other network nodes, VFL port interfaces for VFL 120i and VFL 120j in network node 110e are disabled. Packets are not forwarded to or from network node 110b or network node 110c over VFL 120i and VFL 120j. In addition, other external port interfaces 240 of the network node 110e are disabled to prevent traffic from entering the network node 110e from external nodes 112.

Figure 10C:
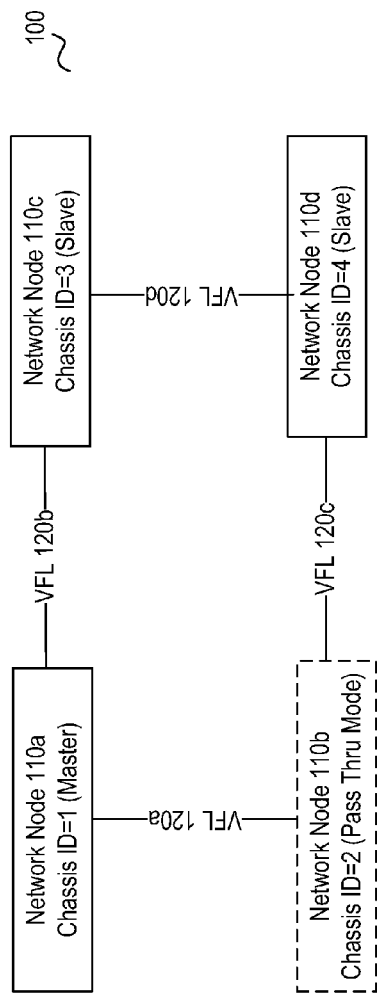

FIG. 10c illustrates a schematic block diagram of another embodiment of a virtual chassis system 100. In this embodiment, network node 110b is placed in a pass thru mode (rather than, e.g. shut down mode) because the network node 110b provides an alternative path in case of failure. For example, if VFL 120b fails, the path through network node 110b would be an alternative path for network node 110a to communicate with network node 110c and network node 110d. As such, for improved resiliency in the virtual chassis system 100, network node 110b is placed in a pass thru mode (rather than, e.g. shut down mode). Network node 110b in pass thru mode is enabled to forward traffic between network node 110a and network node 110d over VFL 120a and VFL 120c. Other external port interfaces 240 are disabled to prevent traffic from entering the network node 110e from external nodes 112.

Figure 10D:
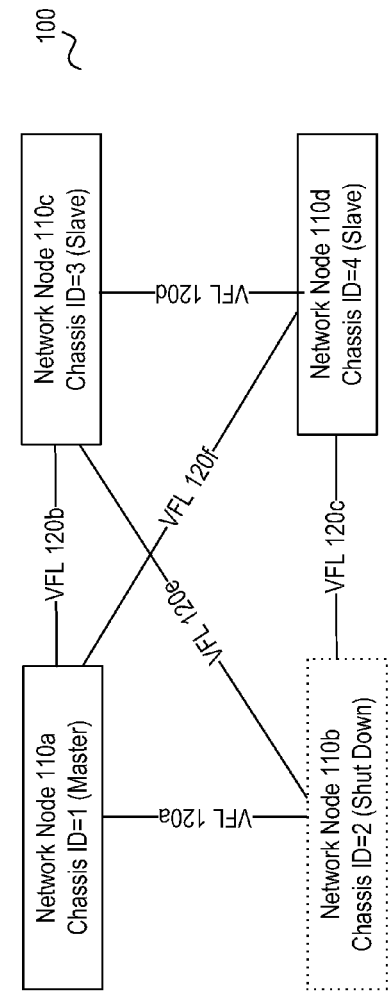

FIG. 10d illustrates a schematic block diagram of an embodiment of another virtual chassis system 100. In this embodiment, network node 110b is placed in shut down mode rather than pass thru mode. Network node 110b is not part of a single path between two network nodes 110 or part of a shortest path between two network nodes 110. In addition, alternative paths exist between the network nodes 110 in the event of failure of one or more VFLs or other network nodes 110 in the virtual chassis system 100. Network node 110b is thus placed in shut down mode and is not enabled to forward data packets over VFLs 120 or over external port interfaces 240. However, a network node 110 in shutdown mode is still operable to receive and process control packets issued from a network or element manager or the master network node. In addition, a network node 110 in shutdown mode is operable to transition into pass thru mode and vice-versa, e.g., in the event the virtual chassis topology or parameters change.

In an embodiment, two types of chassis identifiers (chassis ID) are defined. A first type of chassis identifiers is defined as an operational chassis identifier. The operational chassis identifier of a network node 110 is a runtime value used by the network node 110 and other network nodes 110 and their associated modules in a virtual chassis system 100 to identify the network node 110. The operational chassis identifier of a network node 110 is stored in the topology databases 144 of the other network nodes to identify the network node 110. A second type of chassis identifier is defined as a configured chassis identifier. The configured chassis identifier is stored and maintained in a persistent memory in a network node 110. The configured chassis identifier is used by the network node at start-up, such as at a node reboot. The configured chassis identifier is not altered or reconfigured in a network node 110. However, an operational chassis identifier may be assigned to a network node 110 to be used instead of the configured chassis identifier. When a network node 110 reboots or restarts, the configured chassis identifier is again used as the operational chassis identifier for the network node 110 until a new operational chassis identifier is assigned to the network node 110.

When a network node 110 is assigned to pass thru mode, a new operational chassis identifier is also assigned to the network node 110. The new operational chassis identifier is in a range of chassis identifiers assigned to network nodes in pass thru mode. For example, a network node 110 in pass thru mode is assigned to a predetermined range of operational chassis identifiers, e.g., from 1001 to (MAX_CHASSIS_ID+1000). When a network node 110 transitions to pass thru mode, a pass thru chassis identifier within the predetermined range is allocated and assigned to the network node 110. This pass thru chassis identifier becomes the new operational chassis identifier of the network node 110. Since the pass thru chassis identifier is an operational chassis identifier, it is not stored into persistent memory and does not replace the configured chassis identifier of the network node 110.

FIG. 11 illustrates a logic flow diagram of an embodiment of a method 520 for updating configurations of a network node 110 to pass thru mode. In step 522, a network node 110 receives a command to enter pass thru mode. The command may be issued by a network or element manager module 460 or by the master network node 110 in the virtual chassis system 100. The command includes a pass thru chassis identifier in the predetermined range of operational chassis identifiers for pass thru mode. In step 524, the network node updates its operational chassis identifier to the assigned pass thru chassis identifier.

The network node 110 in step 526 also updates various application modules, as described with FIG. 8, with pass thru configurations. When the VCM-CMM 402 of the network node 110 receives the command to enter pass thru mode, it informs the applications modules, such as application modules 408-418 in FIG. 8, that the network node 110 is no longer operational as a standard virtual chassis node (such as a slave or master node) and is now operational in a pass thru mode. This action prevents certain application modules from performing its normal functions, such as source learning application module 414 no longer performs source learning, and isolates the application modules from interacting with other network nodes 110 in the virtual chassis system 100. The VCM-CMM 402 of the network node 110 informs the VCM-NIM 404 to disable the external port interfaces 240 coupled to external nodes 112 and only enable VFL member ports for certain VFLs 120. For the enabled VFLs 120, the VCM-NIM 404 instructs the switching modules 210 to forward data packet flows to and from one designated VFL 120 to another VFL 120 without altering the prepended headers.

Pass thru of data packets is enabled on a per flow basis. For example, pass thru of a specific data packet flow can be enabled for traffic between two network nodes coupled to the network node 110 by two VFLs 120, e.g. when the network node 110 in pass thru mode is part of the shortest path between the two network nodes. However, other data packet flows between other network nodes 110 or over different VFLs 120 can be disabled. The switching modules 210 for the enabled VFL member ports are informed to forward user data packets between the enabled VFL to another enabled outgoing VFL without amending prepended headers of the data packets. Thus, the VFL routing table 254 is used by the switching module 210 to forward the data packets from one enabled VFL to another enabled VFL based on a destination chassis identifier in the prepended header of the data packets. However, the switching modules 210 no longer update or use the MAC/HDI table 250 to update source or destination MAC addresses with hardware device information or modify the prepended headers of data packets.

The network node 110 in step 528 transmits an update to its topology status to other network nodes and to the network or element manager module 406. The other network nodes 110 receive a topology update of the status of the pass thru network node 110, the reason for pass thru mode, updated operational chassis identifier (e.g., pass thru chassis identifier) for the pass thru network node 110 and the original operational chassis identifier of the pass thru network node 110. The other network nodes 110 in the virtual chassis system update their topology database 144 with the information.

In addition, before entering pass thru mode, a network node generates appropriate logs and management traps (or other types of management protocol messages) to alert a network or element manager module 406 of the event. The network or element manager module 406 may intervene to resolve the conflict or configuration or other issue that initiated the transition to pass thru mode.

A network node 110 may be placed into pass thru mode for one or more issues, such as a hardware or software failure, duplicate chassis identifiers among the network nodes 110, an excess of network nodes 100, mismatch or inconsistency between some relevant configuration parameter or upon an explicit management command. For example, a network node may be placed into pass thru mode in response to inconsistencies of one or more of the following configuration parameters: Node model/type, License settings, virtual chassis group identifier or misconfiguration of communication protocol parameters (e.g., hello protocol or other communication protocols used in the virtual chassis system 100).

FIG. 12 illustrates a logic flow diagram of an embodiment of a method 540 for pass thru mode in the event of an excess of network nodes 100 in a virtual chassis system 100. The master network node 110 in a virtual chassis system determines that an excess of network nodes 110 is present in the virtual chassis system 100. For example, the master network node 110 determines that one or more of the network nodes 110 fail to have external port interfaces 240 coupled to any external nodes 112 and are not needed for connection to external nodes 112. When one or more excess network nodes are identified, the master network node 110 determines to initiate pass thru mode for the one or more excess network nodes 110. The master network node 110 distributes a pass thru assignment command to the plurality of network nodes 110 in the virtual chassis system 100. The assignment command includes a list of excess network nodes (identified by their MAC addresses or chassis identifiers) associated with the pass thru command and a pass thru chassis identifier assigned to each listed node. In addition, the assignment command includes a field with a reason code for the pass thru mode command. The reason code includes a code of one or more reasons for the pass thru command, such as in this case, an excess of network nodes.

Upon reception of a pass thru assignment command, in step 542 of FIG. 12, a network node determines whether the assignment command includes its node identifier in step 546. If so, the network node 110 determines its assigned pass thru chassis identifier and reason code from the pass thru assignment command. The network node in step 548 updates configuration to pass thru mode. For example, the network node 110 changes its operational chassis identifier to the pass thru chassis identifier specified in the assignment command and updates its operational mode to pass thru mode. The network node 110 notifies application modules of the pass thru mode. In step 550, the network node enables two or more VFLs 120 to forward one or more data packet flows between network nodes 110 in the virtual chassis system 100. The network node 110 informs switch modules of one or more enabled VFLs 120 so that the data packet flows are forwarded from one VFL 120 to another VFL 120. In step 552, the network node disables other external port interfaces 240.

In order to support pass thru mode, network nodes 110 are operable to communicate with each other even when an inconsistency or duplicate chassis node identifier occurs. One or more communication protocols are used to provide communication between the network nodes 110 as described in more detail in U.S. patent application Ser. No. 13/674,392, entitled, "VIRTUAL CHASSIS SYSTEM CONTROL PROTOCOLS," filed on the same day herewith, pending, which is incorporated by reference herein and made part of the present U.S. Utility Patent Application for all purposes.

Figure 13:
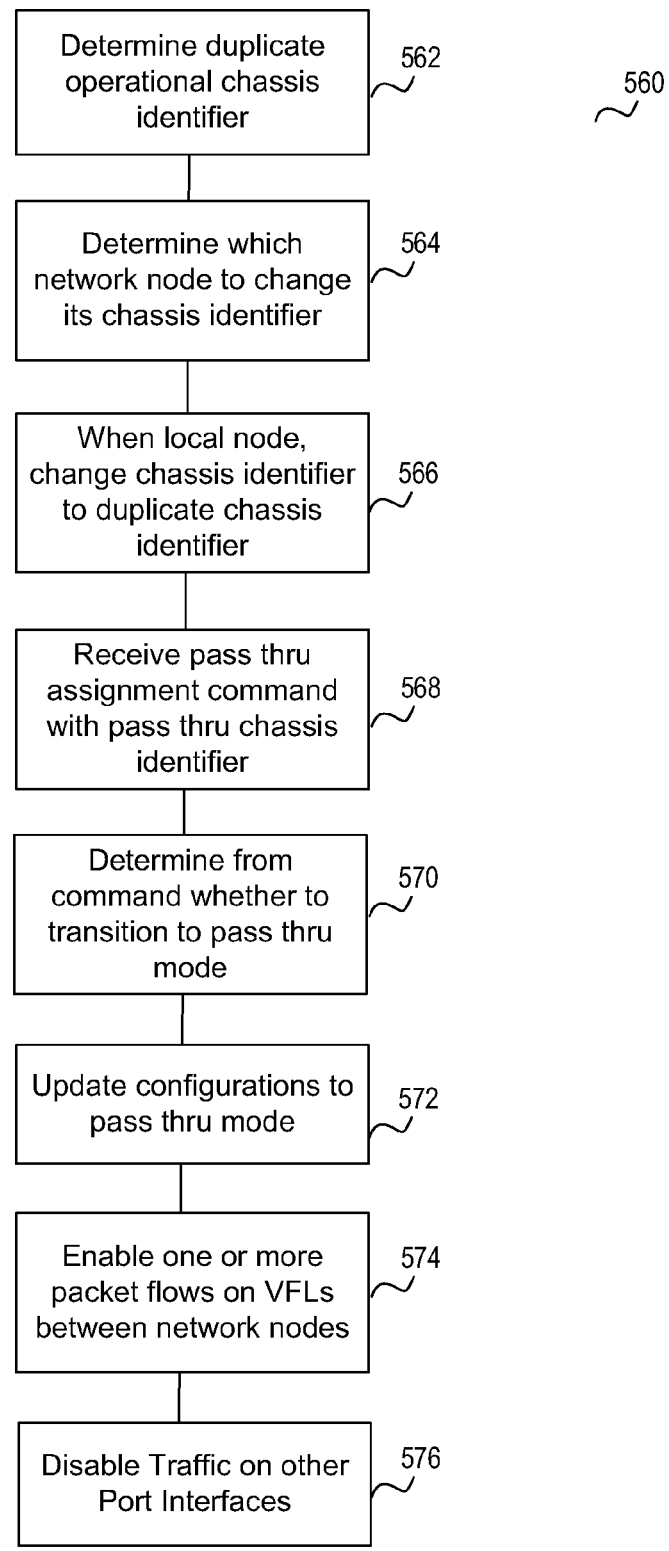
FIG. 13 illustrates a logic flow diagram of an embodiment of a method for pass thru mode in the event of duplicate configuration of operational chassis identifiers in a virtual chassis system in accordance with the present invention.

FIG. 13 illustrates a logic flow diagram of an embodiment of a method 560 for pass thru mode in the event of duplicate configuration of operational chassis identifiers in a virtual chassis system 100. In step 562, a network node 110 determines that another network node 110 has a same operational chassis identifier. For example, through topology discovery, the network node 110 receives a topology update of another network node 110 in the virtual chassis system 100 with a same operational chassis identifier. Since user data packets and control packets are routed over VFLs 120 based on operational chassis identifiers, duplicate operational chassis identifiers may cause misrouting and lost packets in the virtual chassis system 100. Thus, in an embodiment, it is important that each network node 110 is configured with a unique operational chassis identifier.

When duplicate operational chassis identifiers are determined in step 562, the network node 110 in step 564 then determines which network node needs to change its operational chassis identifier. In an embodiment, the network node 110 selects whether it or another node will change its duplicate operational chassis identifier based on a plurality of parameters. The plurality of parameters are used to determine an election key for each network node 110 with a duplicate operational chassis identifier, and then the election keys are compared to determine which network node 110 relinquishes its duplicate operational chassis identifier. For example, in an embodiment, the election key of a network node 110 is determined based on a prioritized list of parameters, including for example, chassis priority, up time, chassis ID, chassis MAC address. The use of the parameters adds flexibility to the selection. The parameter of up time gives priority to network nodes 110 in operation for longer periods of time. The parameter of chassis priority is a user configured priority that defines the user preference regardless of chassis ID or up time. Though a prioritized list of parameters is disclosed herein to determine an election key, other parameters or methods may be used to determine which network node 110 relinquishes its duplicate operational chassis identifier.

When the network node's election key compares unfavorably to the election key of the other network node with the duplicate operational chassis identifier, then the network node 110 determines that it needs to relinquish its duplicate operational chassis identifier. The network node 110 changes its operational chassis identifier to a predetermined duplicate chassis identifier value. For example, a particular identifier value (e.g. such as the value 154), is configured as the predetermined duplicate chassis identifier value in the network nodes 110 of the virtual chassis system 100. The network node 110 then transmits topology updates over VFLs 120 to the other network nodes 110 with its new operational chassis identifier (equal to the predetermined duplicate chassis identifier value). The other network nodes 110 update their topology databases 144 with the network node's new operational chassis identifier.

When the master network node 110 detects that there is a network node with an operational chassis identifier equal to the duplicate chassis identifier value, e.g. through topology updates or other control protocol messages, the master network node 110 determines whether to place the network node with the duplicate chassis identifier into pass thru mode. If so, the master network node 110 transmits a pass thru assignment command. The pass thru assignment command includes a node identifier (such as MAC address or chassis identifier) and a pass thru chassis identifier in the predetermined range of operational chassis identifiers for pass thru mode. The command also includes a reason code for pass thru mode, in this case for example, duplicate operational chassis identifiers.

Upon reception of a pass thru assignment command in step 568 of FIG. 13, the network node 110 determines whether the command includes its node identifier in step 570. If so, the network node 110 determines its assigned pass thru chassis identifier and reason code from the pass thru assignment command. The network node in step 572 updates its configuration to pass thru mode. For example, the network node 110 changes its operational chassis identifier from the duplicate chassis identifier value to the pass thru chassis identifier specified in the assignment command. The network node 110 updates its mode to pass thru and notifies application modules of the pass thru mode. In step 574, the network node 110 enables VFLs 120 to forward one or more data packet flows. The network node 110 informs switch modules 210 of one or more enabled VFLs 120 so that the data packet flows are forwarded from an input VFL 120 to another designated output VFL 120. In step 576, the network node disables other external port interfaces 240.

A network node 110 in pass thru mode does not participate in a master election process as a candidate. However, it does receive topology updates and stores the chassis identifier of the master network node in its topology database 144. A network node 110 in pass thru mode is also operable to participate in the process of identifying duplicate master network nodes and duplicate chassis identifiers. In an embodiment, a network node 110 in pass thru mode may still detect another network node with a duplicate pass thru chassis identifier. For example, a master network node 110 may accidentally assign duplicate pass thru chassis identifiers. Alternatively, when two or more virtual chassis groups (each with its own virtual chassis group identifier) merge into a single virtual chassis system 100, network nodes 110 with duplicate pass thru chassis identifiers may be detected.

Figures 14, 15:
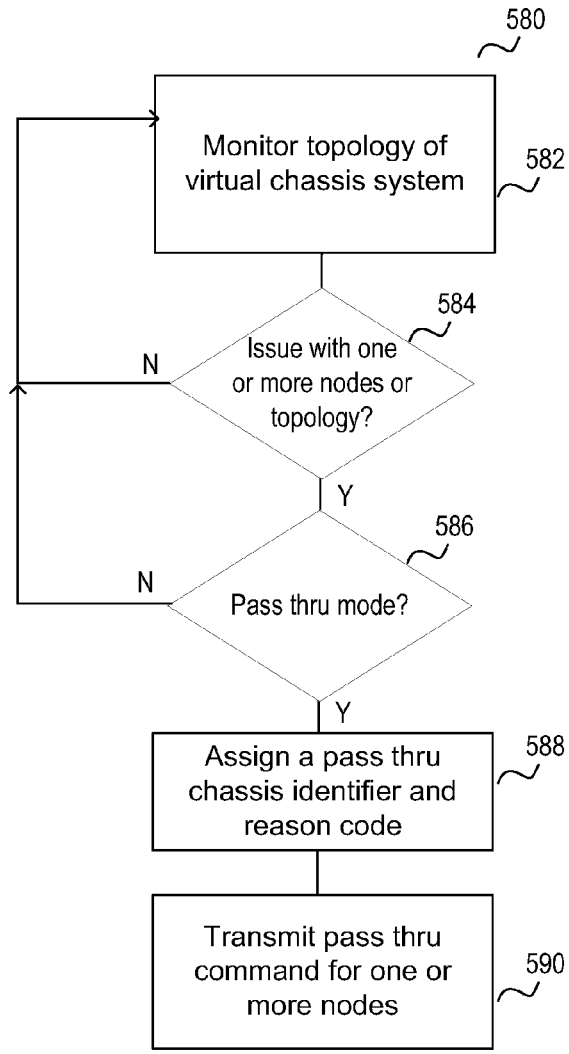
FIG. 14 illustrates a logic block diagram of an embodiment of a method for determining a pass thru mode for a network node in accordance with the present invention.
FIG. 15 illustrates a schematic block diagram of an embodiment of a pass thru assignment command in accordance with the present invention.

FIG. 14 illustrates a logic block diagram of an embodiment of a method 580 for determining a pass thru mode for a network node 110. In an embodiment, a master network node in step 582 monitors the topology of a virtual chassis system 100 and its network nodes. In step 584, the master network node 110 determines whether one or more issues exist in the overall topology, such as excess network nodes, or whether one or more issues exist with one or more network nodes 110, such as duplicate chassis identifiers. In addition, the master network node 110 determines whether a mismatch or inconsistency between some relevant configuration parameters has occurred, such as inconsistencies of one or more of the following configuration parameters: Node model/type, License settings, virtual chassis group identifier or misconfiguration of communication protocol parameters (e.g., hello protocol or other communication protocols used in the virtual chassis system 100). When the master network node 110 determines that an issue exists in step 584, the master network node 110 determines whether to assign one or more network nodes 110 to pass thru mode. For example, the master network node 110 determines based on the virtual chassis topology whether a network node 110 is part of a single path or shortest path to other network nodes or whether a network node 110 is part of an alternative path between other network nodes in case of failure. In addition, the master network node 110 may determine based on election keys whether one or more network nodes should be placed in pass thru mode. Alternatively, the master network node 110 may receive an explicit management command from a network or element manager module 406 to assign a certain network node to pass thru mode.

When the master network node 110 determines in step 586 that one or more network nodes are to be assigned to pass thru mode, it determines a pass thru chassis identifier in the predetermined range of operational chassis identifiers for pass thru mode and a reason code for each network node to be assigned to pass thru mode in step 588. The master network node 110 then transmits a pass thru assignment command to the plurality of network nodes in the virtual chassis system 100 with this information.

Though a master network node is described as performing steps or processes in FIG. 14, a network or element manager module 406 may also perform or alternatively perform one or more of the steps or processes described with respect to FIG. 14. For example, in an embodiment, a network or element manager module 406 monitors the topology and network nodes of the virtual chassis system to determine whether an issue has occurred. The network or element manager module 406 then determines whether to initiate a pass thru mode for one or more network nodes 110 based on the topology of the virtual chassis system and if so, issues a management command to the master network node.

FIG. 15 illustrates a schematic block diagram of an embodiment of a pass thru assignment command 600. The pass thru assignment command 600 includes a packet type field 602 that includes an identification of the packet as a control packet and a command type field 604 that identifies the control packet as a pass thru assignment. The pass thru assignment command 600 includes a node identifier field 606. The node identifier field 606 includes an identifier (such as MAC address or chassis identifier) of one or more network nodes that are being assigned to pass thru mode. Pass thru chassis identifier field 608 includes a pass thru chassis identifier for each identified network node being assigned to pass thru mode, and reason code field 610 includes a code for a reason for assignment to pass thru mode for each identified network node being assigned to pass thru mode. Additional or alternative fields may also be included in the pass thru assignment command 600 with similar or additional information.

Pass thru mode provides a system and method for user data and control traffic to flow through a network node in a virtual chassis system in response to detection of misconfiguration, inconsistencies or failures in the network node. Pass thru mode thus helps to avoid topology fracture and service interruption in a virtual chassis system.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item, or one item configured for use with or by another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional schematic blocks, and other illustrative blocks, modules and components herein, can be implemented as illustrated or combined or separated into discrete components, application specific integrated circuits, processors executing appropriate software and the like or any combination thereof.

The present invention is described herein, at least in part, in terms of one or more embodiments. An embodiment is described herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements.

The term "module" is used in the description of the various embodiments of the present invention. A module includes a processing module (as described above), a functional block, hardware, and/or software stored on memory operable to perform one or more functions as described herein. Note that, if the module is implemented via hardware, the hardware may operate independently and/or in conjunction with software and/or firmware. When a module is implemented as software stored in memory, the module is operable to use a processing module or other hardware to execute the software stored in memory in the module to perform the functions as described herein. A module described herein may include one or more sub-modules, each of which may be one or more modules, be incorporated into one or more other modules or include one or more other modules.

While particular combinations of various functions and features of the present invention are expressly described herein, other combinations of these features and functions are likewise possible. The embodiment described herein are not limited by the particular examples described and may include other combinations and embodiments.

What is claimed is:

1. A network node operable in a virtual chassis system, comprising:
one or more network interface modules operable to:
receive data packets from one or more external nodes through one or more external port interfaces;
modify the data packets to generate packets with prepended headers, wherein the prepended headers include destination chassis identifiers; and
transmit the packets with prepended headers to one or more of a plurality of network nodes in the virtual chassis system over one or more virtual fabric links (VFL), wherein the plurality of network nodes are operably coupled by the plurality of VFLs;
at least one management module operable to:
receive a pass thru command, wherein the pass thru command includes a pass thru chassis identifier;
configure the network node to a pass thru mode in response to the pass thru command, wherein a first chassis identifier of the network node is reconfigured to the pass thru chassis identifier;
disable the one or more external port interfaces from receiving data packets from the one or more external nodes;
enable at least two or more of the plurality of VFLs coupled to the network node for transmission of packets with prepended headers;

determine another network node of the plurality of network nodes has a duplicate operational chassis identifier as the first chassis identifier of the network node based on a plurality of prioritized parameters; and determine whether the network node or the another network node changes its duplicate chassis identifier.

2. The network node of claim 1, wherein the one or more network interface modules are operable to:

receive a first packet with prepended header over a first VFL;

determine a destination chassis identifier from the prepended header of the first packet; and transparently forward the first packet with prepended header over a second VFL to another network node with the destination chassis identifier.

3. The network node of claim 2, wherein the one or more network interface modules are operable to:

access an address table, wherein the address table includes the destination chassis identifier from the first packet and a corresponding VFL identifier associated with the destination chassis identifier, wherein the corresponding VFL identifier identifies the second VFL coupled to the another network node with the destination chassis identifier.

4. The network node of claim 1, wherein the at least one management module is further operable to:

transmit a topology status update to the plurality of network nodes in the virtual chassis system, wherein the topology status update includes the pass thru chassis identifier for the network node.

5. The network node of claim 1, wherein the at least one management module is further operable to:

determine to change the first chassis identifier of the network node based on the plurality of prioritized parameters to a predetermined duplicate chassis identifier value; and transmit a topology status update to the plurality of network nodes in the virtual chassis system, wherein the topology status update includes the predetermined duplicate chassis identifier value.

6. A method operable in a network node, comprising:

receiving data packets from one or more external nodes through one or more external port interfaces;

modifying the data packets to generate packets with prepended headers, wherein the prepended headers include destination chassis identifiers;

transmitting the packets with prepended headers to one or more of a plurality of network nodes in a virtual chassis system over one or more of a plurality of virtual fabric links (VFL);

receiving a pass thru command;

configuring the network node to a pass thru mode in response to the pass thru command;

disabling the one or more external port interfaces from receiving data packets from the one or more external nodes;

enabling at least two or more of the plurality of VFLs coupled to the network node for transmission of packets with prepended headers between at least two network nodes operably coupled to the network node by at least two or more enabled VFLs;

transmitting a topology status update to the plurality of network nodes in the virtual chassis system, wherein the topology status update includes a pass thru chassis identifier for the network node;

determining another network node of the plurality of network nodes has a duplicate operational chassis identifier as the first chassis identifier of the network node;

determining whether the network node or the another network node changes its duplicate chassis identifier based on a plurality of prioritized parameters;

determining to change the first chassis identifier of the network node based on the plurality of prioritized parameters to a predetermined duplicate chassis identifier value; and transmitting a topology status update to the plurality of network nodes in the virtual chassis system, wherein the topology status update includes the predetermined duplicate chassis identifier value.

7. The method of claim 6, further comprising:

receiving a first packet with prepended header over a first enabled VFL;

determining a destination chassis identifier from the prepended header;

accessing an address table, wherein the address table includes the destination chassis identifier and a corresponding VFL identifier associated with the destination chassis identifier, wherein the corresponding VFL identifier identifies a second VFL coupled to another network node with the destination chassis identifier; and transparently forwarding the first packet with prepended header over the second VFL to the another network node with the destination chassis identifier.

* * * * *